US011860959B1

(12) United States Patent
Chang et al.

(10) Patent No.: US 11,860,959 B1
(45) Date of Patent: Jan. 2, 2024

(54) RANKING NOTIFICATIONS IN A SOCIAL NETWORK FEED

(71) Applicant: Snap Inc., Santa Monica, CA (US)

(72) Inventors: Sheldon Chang, Venice, CA (US); Yaming Lin, Palo Alto, CA (US); Andre Madeira, Saratoga, CA (US); Jeremy Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 1094 days.

(21) Appl. No.: 16/146,171

(22) Filed: Sep. 28, 2018

Related U.S. Application Data

(60) Provisional application No. 62/591,414, filed on Nov. 28, 2017.

(51) Int. Cl.
  *G06F 16/9535* (2019.01)
  *G06N 20/00* (2019.01)

(52) U.S. Cl.
  CPC ......... *G06F 16/9535* (2019.01); *G06N 20/00* (2019.01)

(58) Field of Classification Search
  None
  See application file for complete search history.

(56) References Cited

U.S. PATENT DOCUMENTS

| | | | | |
|---|---|---|---|---|
| 8,707,201 B1 * | 4/2014 | Aradhye | ................ | H04L 51/26 715/789 |
| 8,886,641 B2 * | 11/2014 | Dong | ................ | G06F 16/9535 707/725 |
| 9,454,586 B2 * | 9/2016 | Ghosh | ................ | G06F 16/382 |
| 10,057,199 B2 * | 8/2018 | Ball | ................ | G06Q 30/0269 |
| 10,305,851 B1 * | 5/2019 | Gade | ................ | H04L 51/00 |
| 10,372,715 B1 * | 8/2019 | James | ................ | G06F 16/24578 |
| 10,545,969 B2 * | 1/2020 | Ball | ................ | H04L 51/32 |
| 10,924,348 B1 * | 2/2021 | Yu | ................ | G06F 16/2428 |
| 11,106,686 B1 * | 8/2021 | Chung | ................ | G06F 16/9535 |
| 11,134,036 B2 * | 9/2021 | Taitz | ................ | H04L 51/10 |
| 11,157,464 B1 * | 10/2021 | Agrawal | ................ | G06F 16/21 |
| 11,250,075 B1 * | 2/2022 | Al Majid | ................ | G06F 16/9536 |
| 11,288,310 B2 * | 3/2022 | Al Majid | ................ | G06F 3/016 |
| 11,343,209 B2 * | 5/2022 | Al Majid | ................ | H04L 51/10 |
| 11,388,226 B1 * | 7/2022 | Anderton | ................ | G06Q 10/10 |
| 11,477,143 B2 * | 10/2022 | Al Majid | ................ | H04L 51/52 |

(Continued)

OTHER PUBLICATIONS

Dong et al., "Towards Recency Ranking in Web Search," Feb. 4-6, 2010, New York City, New York, USA, Proceedings of the third ACM international conference on Web search and data mining. (Year: 2010).*

(Continued)

*Primary Examiner* — Amy Ng
*Assistant Examiner* — Mellissa M. Ohba
(74) *Attorney, Agent, or Firm* — Schwegman Lundberg & Woessner, P.A.

(57) ABSTRACT

Systems and methods for ranking a feed in a social network. The systems and methods include operations for displaying a feed includes identifying a group of users associated with a first user, identifying a plurality of content generated by one or more of the group of users, determining one or more actions that may result when each of the plurality of content is presented to the first user, ranking the content based on the one or more determined actions, and displaying the content to the first user according to the ranking.

19 Claims, 19 Drawing Sheets

(56) References Cited

U.S. PATENT DOCUMENTS

| | | | | |
|---|---|---|---|---|
| 2008/0126476 A1* | 5/2008 | Nicholas | ................ | G06Q 10/10 709/203 |
| 2010/0049538 A1* | 2/2010 | Frazer | ................ | G06Q 30/0244 705/14.43 |
| 2014/0052782 A1* | 2/2014 | Ryan | .................... | G06Q 30/02 709/204 |
| 2014/0129942 A1* | 5/2014 | Rathod | ........... | H04N 21/44222 715/720 |
| 2014/0207564 A1* | 7/2014 | Dubey | .................. | G06Q 30/02 705/14.43 |
| 2014/0337126 A1* | 11/2014 | Ohanyan | ........... | G06Q 30/0251 705/14.49 |
| 2015/0032509 A1* | 1/2015 | Fuentes | .................. | G06F 16/00 705/7.32 |
| 2015/0066583 A1* | 3/2015 | Liu | .................... | G06Q 30/0255 705/7.29 |
| 2015/0113434 A1* | 4/2015 | Lineberger | .............. | H04L 51/32 715/751 |
| 2015/0113447 A1* | 4/2015 | Lineberger | ........ | G06Q 30/0261 715/758 |
| 2015/0178691 A1* | 6/2015 | Lineberger | ........... | G06F 40/134 705/7.19 |
| 2015/0302456 A1* | 10/2015 | Rego | ................. | G06Q 30/0235 705/14.35 |
| 2016/0112357 A1* | 4/2016 | Lineberger | .............. | H04L 51/12 709/204 |
| 2016/0149956 A1* | 5/2016 | Birnbaum | ............... | H04L 63/20 726/1 |
| 2016/0170993 A1* | 6/2016 | Katz | ................... | G06F 16/9535 707/727 |
| 2016/0225013 A1* | 8/2016 | Hartman | ............... | G06F 3/0482 |
| 2016/0314132 A1* | 10/2016 | Lineberger | ........ | G06Q 10/1093 |
| 2016/0321260 A1* | 11/2016 | Owens | ................ | G06F 16/9535 |
| 2016/0343037 A1* | 11/2016 | Nicholas | ............... | H04L 67/306 |
| 2016/0373397 A1* | 12/2016 | Kesten | ................ | H04L 67/2842 |
| 2017/0063774 A1* | 3/2017 | Chen | .................... | H04L 51/216 |
| 2017/0118304 A1* | 4/2017 | Ratiu | ...................... | H04L 67/26 |
| 2017/0140036 A1* | 5/2017 | Owens | ................... | G06N 20/00 |
| 2017/0140051 A1* | 5/2017 | Ball | ....................... | H04L 51/32 |
| 2017/0142044 A1* | 5/2017 | Ball | ....................... | G06Q 50/01 |
| 2017/0169029 A1* | 6/2017 | Song | .................... | G06F 16/313 |
| 2017/0171139 A1* | 6/2017 | Marra | .................. | H04L 51/214 |
| 2017/0171342 A1* | 6/2017 | Wang | ................... | H04L 67/568 |
| 2018/0046929 A1* | 2/2018 | Xuan | .................... | G06Q 10/00 |
| 2018/0082313 A1* | 3/2018 | Duggin | ................. | G06N 20/00 |

OTHER PUBLICATIONS

Choche, "REPLETE: A Realtime Personalized Search Engine for Tweets," https://getd.libs.uga.edu/pdfs/choche_akshay_v_201305_ms.pdf (Year: 2013).*

* cited by examiner

RANKING NOTIFICATIONS IN A SOCIAL NETWORK FEED

CROSS REFERENCE TO RELATED APPLICATIONS

This application claims priority to U.S. Provisional Application No. 62/591,414, filed Nov. 28, 2017 and entitled RANKING NOTIFICATIONS IN A SOCIAL NETWORK FEED." The contents of this prior application are considered part of this application, and are hereby incorporated by reference in their entirety.

TECHNICAL FIELD

The present disclosure generally relates to the technical field of prioritizing information. In particular, this disclosure solves the technical problem of sorting notifications in a data stream.

BACKGROUND

As the popularity of social networking grows, users are obtaining more information from their social networks. Users are presented with a large volume of information via their social network connections. In some circumstances, the volume is so large it may be necessary to prioritize the information for the user. Therefore, improved methods of determining how to prioritize information for display to a user are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
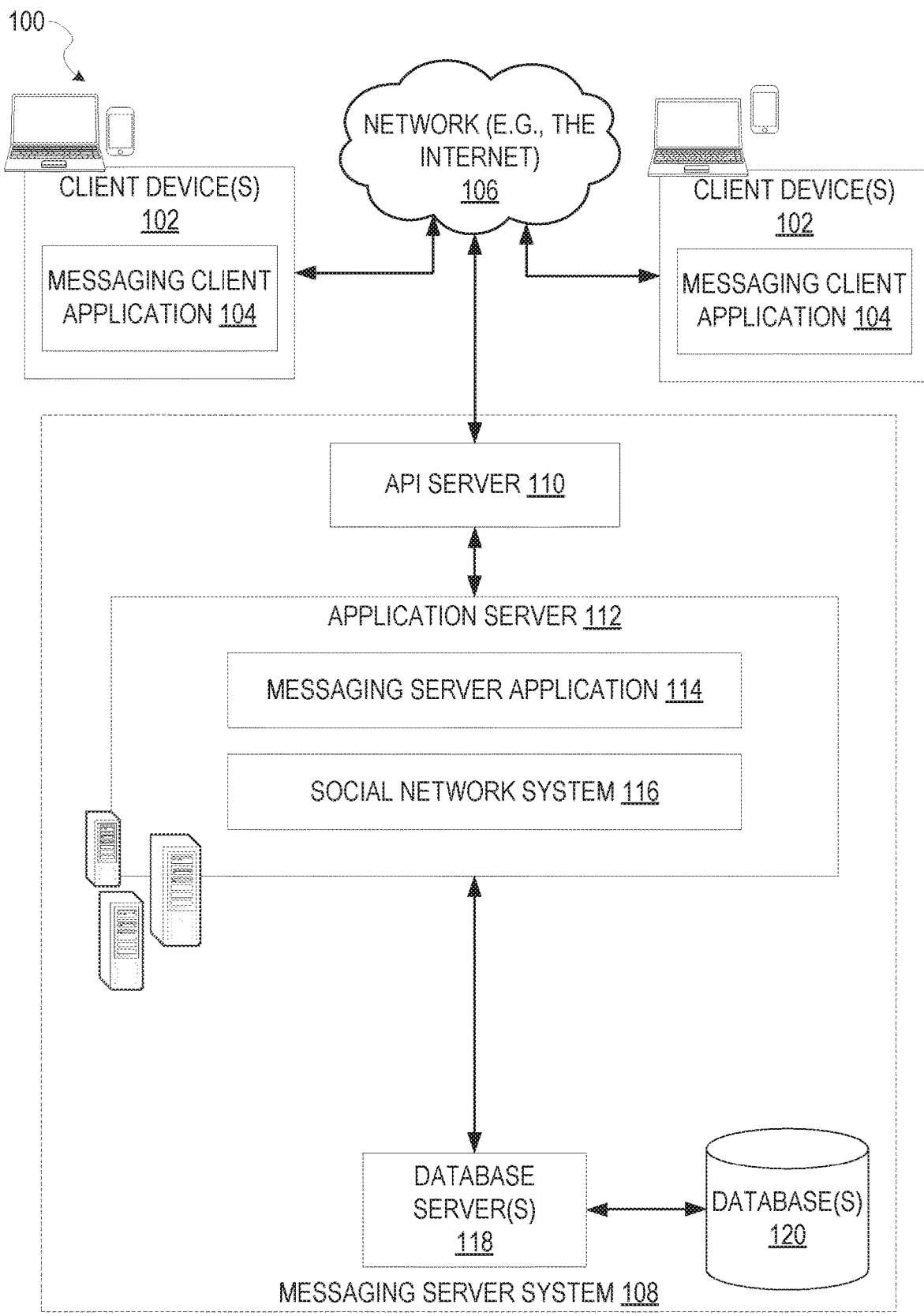
FIG. 1 is a block diagram showing an example messaging system for exchanging data (e.g., messages and associated content) over a network, according to some embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Disclosed are methods, systems, devices, and computer readable storage medium for ranking entries or notifications in a feed in a social network. Feeds in social networking applications may provide information to a user of a social network. The user may be registered or subscribed to receive information from a variety of information sources. For example, a user may be registered to receive information from one or more other users with which the user has a "friend" relationship. The user may also be registered to receive information from one or more other content sources, such as news sources, advertising sources, or event sources. As new content is generated from these one or more information sources, it may be displayed in one or more feeds for the user. Each feed may provide a prioritized list of information, organized from a top of the feed (typically with higher priority content at the top) to a bottom of the feed (with lower priority content at the bottom). Some feeds may be organized according to a time the content was generated, with more recent content appearing above older content.

The disclosed embodiments receive a plurality of content for display within a user feed, and determine how the content should be displayed. Some of the disclosed embodiments may utilize machine learning models to assist with a determination of which content to display in a feed and how to display it.

Social network users may have many friend relationships established with other users within the social network. As these other users post content to the social network, a notification indicating the updated content may become available to any friend of the user. When many friends of a user post content that result in notifications, a need to prioritize which notifications are displayed to the user arises.

This prioritization may determine for example, which content or notification from friends appears at a "top" of a feed, or appear more conspicuously presented to the user (e.g., positioned on the display at a location with a high probability of user engagement), and which content may appear lower in the feed, or less conspicuously presented to the user. In some aspects, it may be more likely for a user to view content at or near the top of their feed, as scrolling down through the feed requires some time and is less convenient than simply reviewing the more visible content near the "top" of the feed. Therefore, how content or notifications are displayed to a user can, in some cases, have a substantial impact on which notifications or content are viewed by the user. As viewing notifications or content may have a positive or negative effect on a user's experience with the social network, it may be desirable to tailor the notifications provided to a user to increase a probability that the user has a positive experience.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

In the example shown in FIG. 1, each messaging client application 104 is able to communicate and exchange data with another messaging client application 104 and with the messaging server system 108 via the network 106. The data exchanged between the messaging client applications 104, and between a messaging client application 104 and the messaging server system 108, includes functions (e.g., commands to invoke functions) as well as payload data (e.g., text, audio, video, or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT). Evolution-Data Optimized (EVDO) technology. General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS). High-Speed Packet Access (HSPA). Worldwide Interoperability for Microwave Access (WiMAX), Long-Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections; the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 116. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services, and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

Figure 2:
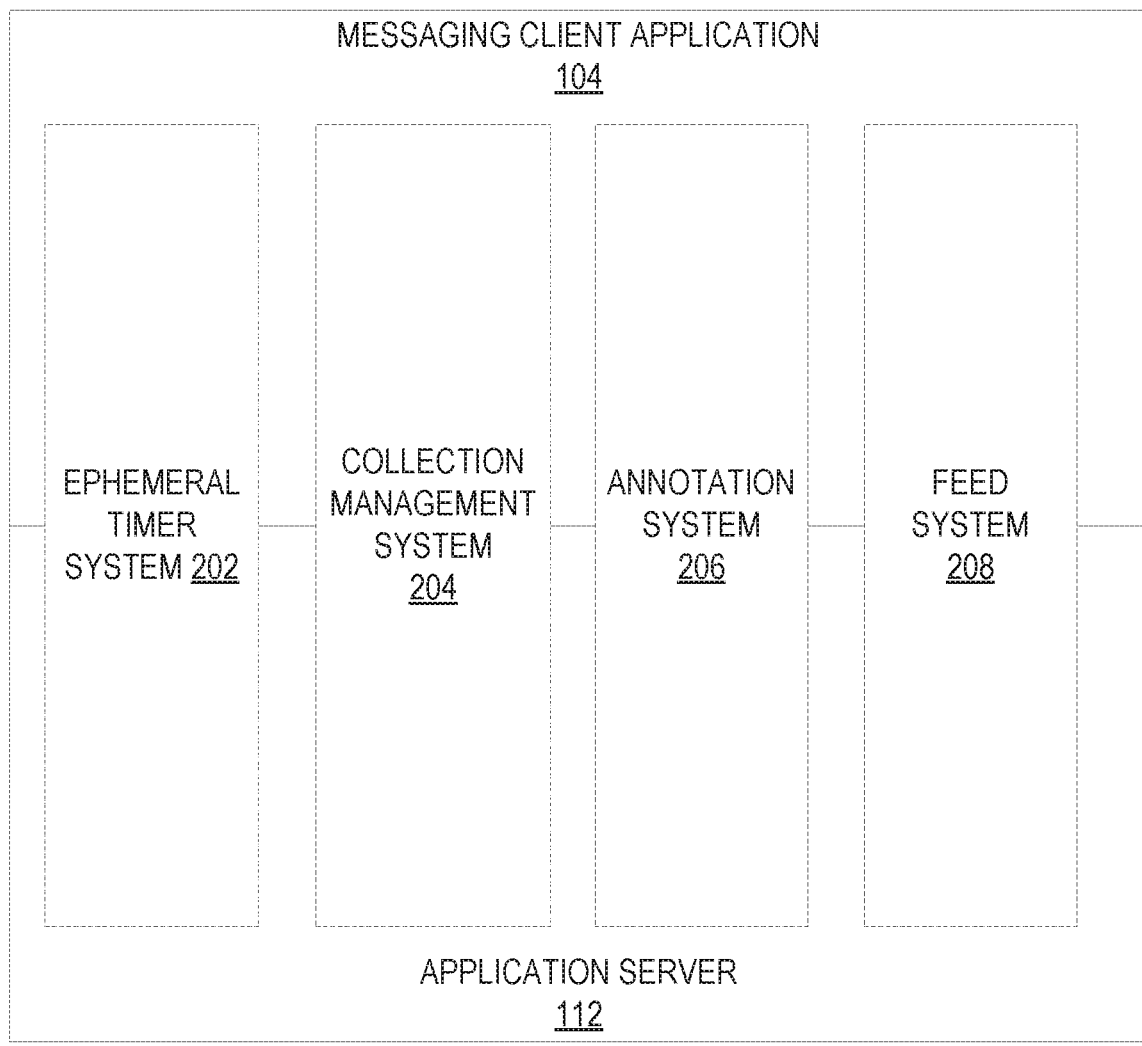
FIG. 2 is block diagram illustrating further details regarding the messaging system, according to some embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of subsystems, namely an ephemeral timer system 202, a collection management system 204, an annotation system 206, and a feed system 208.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The annotation system 206 provides various functions that enable a user to annotate or otherwise modify or edit media content associated with a message. For example, the annotation system 206 provides functions related to the generation and publishing of media overlays for messages processed by the messaging system 100. For example, the annotation system 206 operatively supplies a media overlay (e.g., a filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one exemplary embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another exemplary embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The feed system 208 provides a display of content added or updated by a user's friends. For example, as discussed above, a social network user may establish friend relationships with other social network users via the social messaging system 100. When a friend updates or adds new content to the social messaging system 100, this new or updated content may appear in a "feed" for the user. Users with several friends may be presented with more updates or new content from friends than can be reasonably displayed at one time on a display of the user's device, such as a mobile device or client device 102.

Figure 3A:
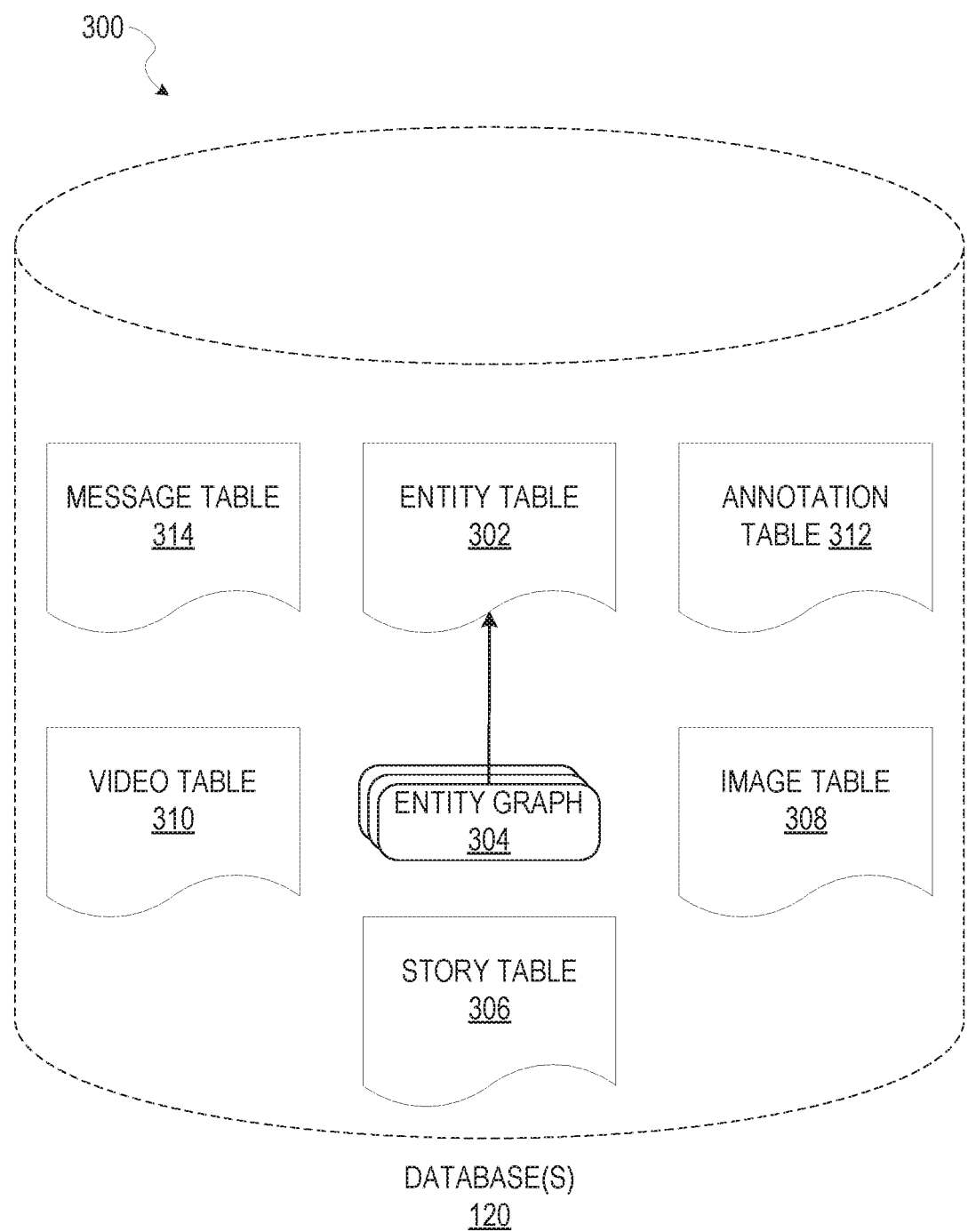
FIG. 3A is a schematic diagram illustrating data which may be stored in a database of the messaging system, according to some embodiments.

FIG. 3A is a schematic diagram 300 illustrating data which may be stored in the database 120 of the messaging server system 108, according to certain exemplary embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a Story or a gallery). The creation of a particular collection may be initiated by a particular user (e.g., a user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story." which is a collection of content from multiple users that is created manually, automatically, or using a combination of manual and automatic techniques. For example, a "live story" may constitute a curated stream of user-submitted content from various locations and events. Users whose client devices have location services enabled and who are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3B:
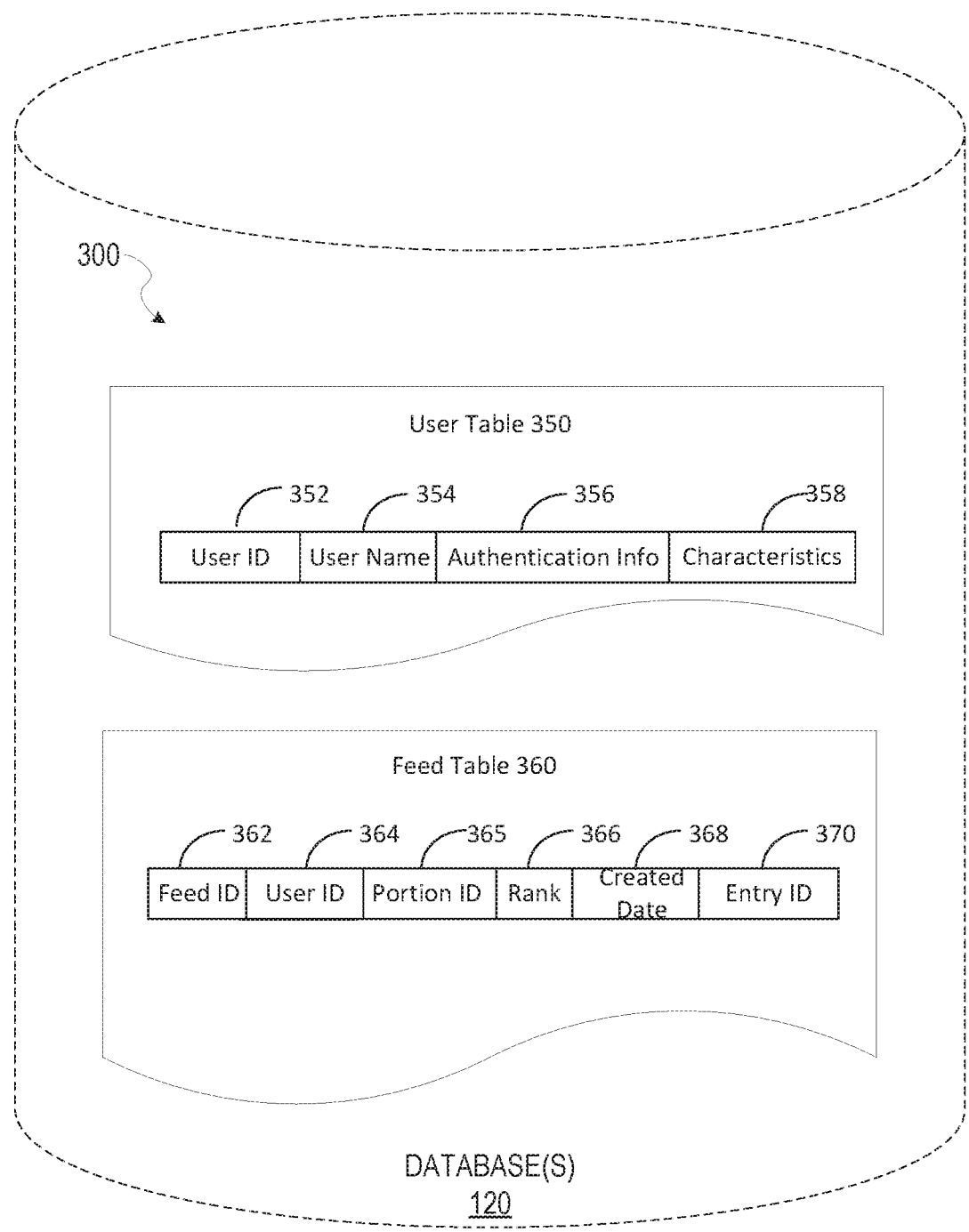
FIG. 3B is a schematic diagram illustrating data which may be stored in a database of the messaging system, according to some embodiments.

FIG. 3B shows some additional tables that may be included in the database 120 in some embodiments. FIG. 3B shows a user table 350 and a feeds table 360. The user table 350 stores information relating to user accounts for the social network system 116. For example, the user table 350 may store, for each user, a user id 352, user account name 354, user account authentication information 356, and user characteristic information 358. The user account authentication information 356 may include, for example, user account credentials such as password information to login to the user account. Once a user has logged in, they may have access to data associated with the user account identified by the user id 352. The user characteristic information 358 may include one or more attributes or characteristics of the user, including the user's zip code, amount of time as a member of the social network system 116, a measurement of the user's frequency of use of the social network system 116, and/or user demographic characteristics. The user characteristics may be used in some aspects to identify historical responses to content by historical user's that are similar to a user to which content will be presented by the contemplated embodiments.

The feed table 360 includes rows for each entry in feeds of the social network system 116. The feed table 360 includes a feed identifier 362, user identifier 364, portion identifier 365, ranking within the feed 366, a created date for the entry 368, and an entry identifier 370. The feed identifier 362 may uniquely identify a particular feed of information. The portion identifier 365 may identify a portion of the feed identified by feed identifier 362 in which the entry appears or is placed. A combination of feed identifier 362 and portion identifier 365 uniquely identifies a particular feed portion. Feed portions may be ranked independently from one another in some of the disclosed aspects. If two or more content are within the same feed portion, they may be ranked relative to each other for display. The rank for an entry is stored in the rank field 366. Entries not in the same feed portion, but in the same feed, may or may not be ranked relative to each other. The entry identifier 370 may identify an entry or row in the entry table 380, discussed below with respect to FIG. 3C.

Figure 3C:
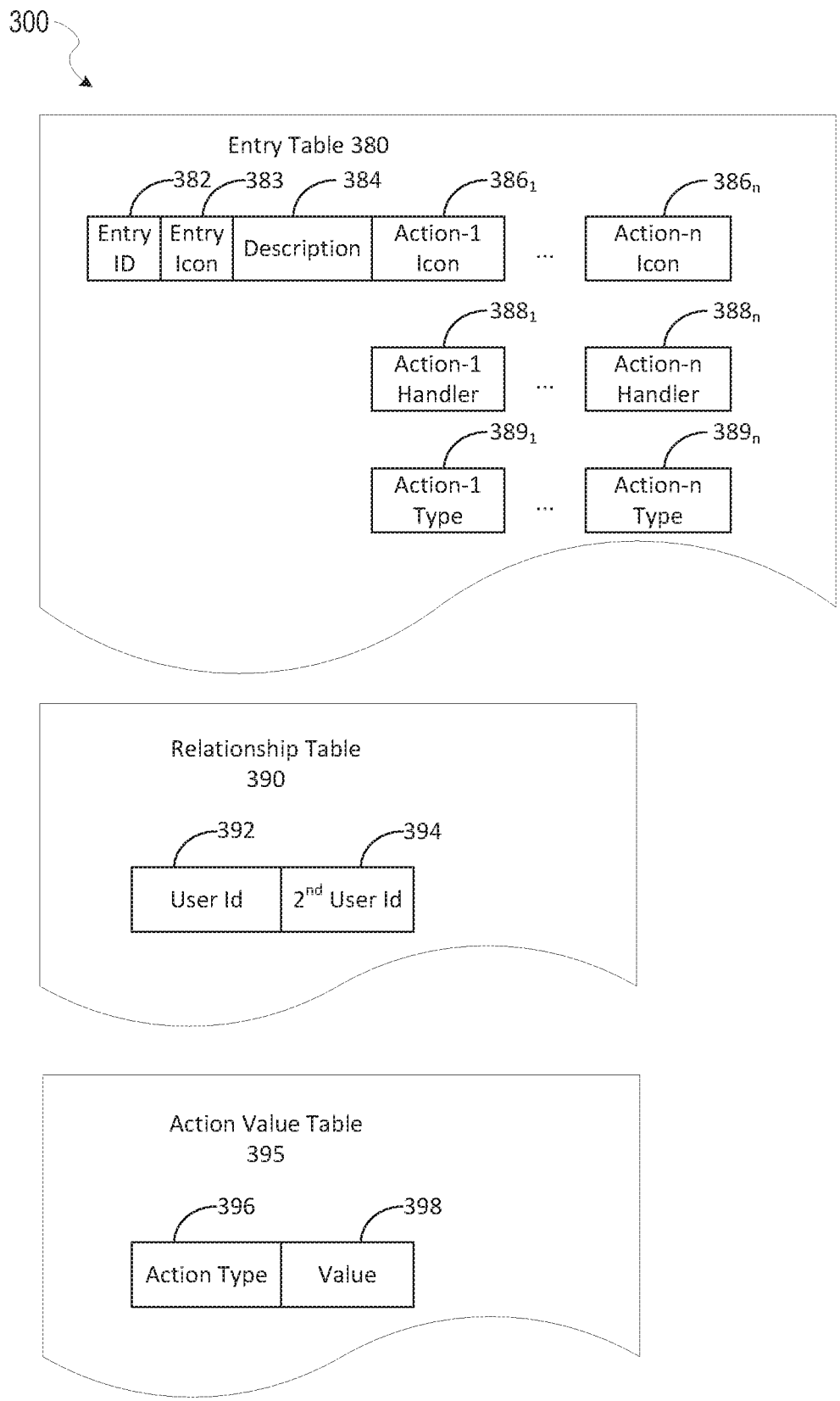
FIG. 3C is a schematic diagram illustrating data which may be stored in a database of the messaging system, according to some embodiments.

FIG. 3C is a schematic diagram illustrating data which may be stored in a database of the messaging system, according to some embodiments. FIG. 3C shows an entry table 380. The entry table 380 may store data for individual entries within a feed. The entry table 380 includes an entry identifier 382, entry icon 383, entry description 384, and one or more pairs of entry action icons and entry action handlers, $386_{1-n}$ and $388_{1-n}$ respectively. The entry icon 383 may be displayed when the entry is represented in a feed, as may the description 384. The action icons $386_{1-n}$ may graphically represent actions that may be taken from the entry when the entry is displayed in a feed. Selecting the icon may invoke an action handler identified by the corresponding action handler field $388_{1-n}$. The entry table 380 also includes action type fields $389_{1-n}$. The action type fields $389_{1-n}$ identify a type of action invoked by the corresponding action handler $388_{1-n}$. For example, in some embodiments, action types may include chat, email, share, etc.

FIG. 3C also shows a relationship table 390. The relationship table 390 shows relationships between two users, identified via user identifiers 392 and 394. The user identifiers 392 and 394 may be cross referenced with user identifiers 352 and 364. In some aspects, content generated by one of the users identified via 392 or 394 may also generate an entry for the other user. For example, if the relationship table 390 represents friend relationship between two users, content generated by a friend may be a candidate for appearance in the other user's feed. Some implementations may include multiple relationship tables 390 to store different types of relationships. For example, family relationships may be stored in a first relationship table 390 while friend relationships are stored in a second relationship table 390.

FIG. 3C also illustrates an action value table 395. The action value table 395 associates a value with different types of actions. The action value table 395 maps an action type 396 to a value 398. The action value table 395 may be accessed by some of the disclosed embodiments to associate a value with each of a set of actions provided by entries in a feed. The values may be used to rank the entries, in that entries with a highest value may be ranked above entries having a lower value. In some aspects, as discussed further below, a probability of an action occurring may discount the action's value. Thus, low value actions having a high probability of being selected may, in some aspects, be ranked more highly than higher value actions having a lower probability of being selected.

Figure 4:
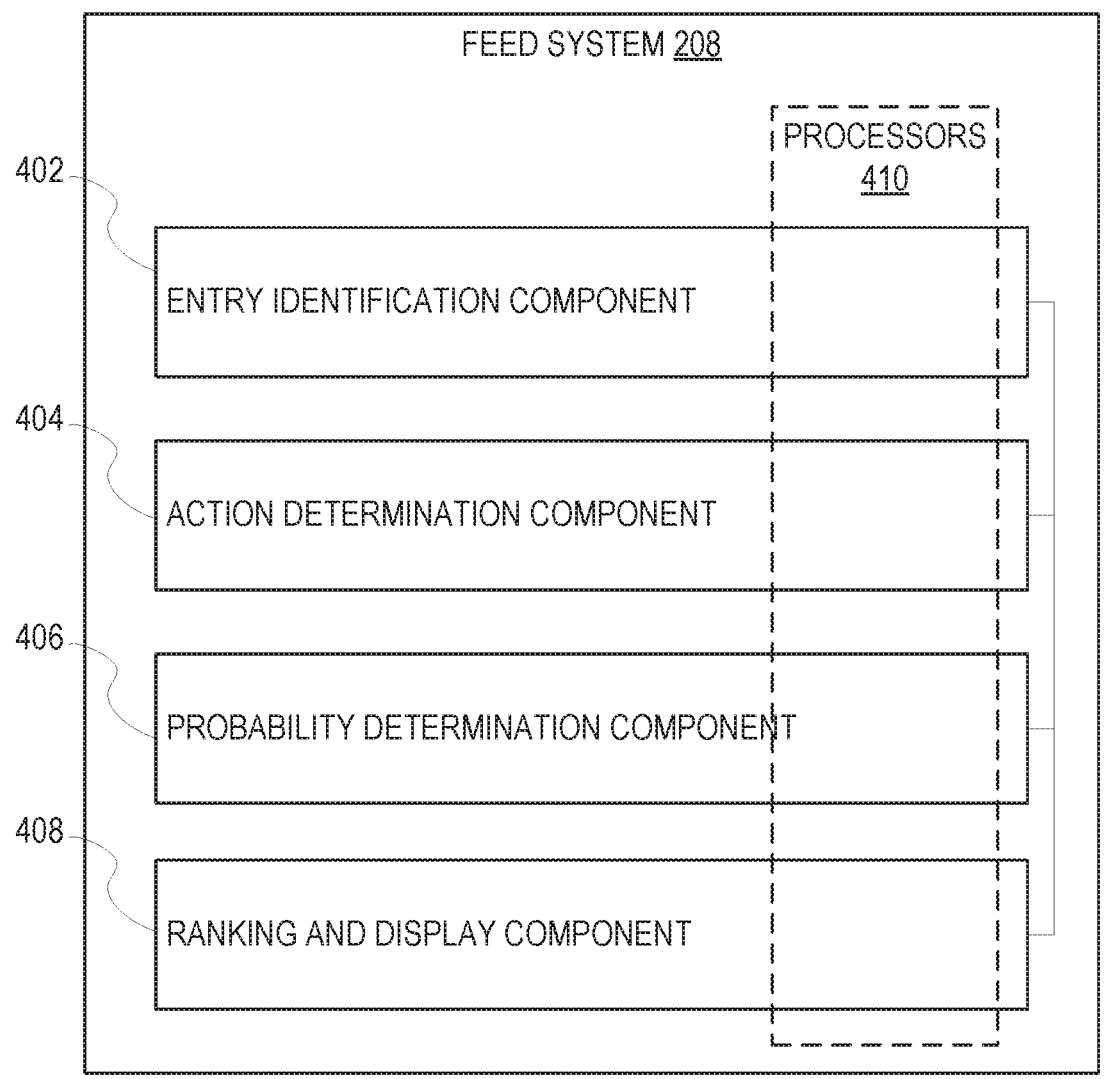
FIG. 4 is a block diagram illustrating functional components of a feed display system that forms part of the messaging system, according to some example embodiments.

FIG. 4 is a block diagram illustrating functional components of the feed system 208 that forms part of the messaging system 100, according to some example embodiments. To avoid obscuring the inventive subject matter with unnecessary detail, various functional components (e.g., modules, engines, and databases) that are not germane to conveying an understanding of the inventive subject matter have been omitted from FIG. 4. However, a skilled artisan will readily recognize that various additional functional components may be supported by the feed system 208 to facilitate additional functionality that is not specifically described herein. As shown, the feed system 208 includes an entry identification component 402, an action determination component 404, a probability determination component 406, and a ranking and display component 408.

The above referenced functional components of the feed system 208 are configured to communicate with each other (e.g., via a bus, shared memory, a switch, or APIs). Collectively, these components facilitate presenting of a feed of information content to a social network user based on content added or updated by friends of the social network user. In other words, the entry identification component 402, an action determination component 404, a probability determination component 406, and a ranking and display component 408 work in conjunction to provide a prioritized display of content for the user based on one or more characteristics of the user, the user's friends, and the updated or content available for presentation in the user's friend feed.

The entry identification component 402 may identify a list of one or more new or updated content from friends of a social network user. For example, the entry identification component 402 may first identify a list of friends of the user. The entry identification component 402 may then identify one or more updated or new content within a predetermined time period from each of the identified friends. This content may then be provided to the action determination component 404.

The action determination component 404 may determine possible actions that can be taken from each entry identified by the entry identification component 402. In some aspects, the action determination component 404 may first determine a type of update or new content provided by the entry identification component 402. A list of possible actions may then be determined based on the type.

The probability determination component 406 may determine a probability that each action identified by the action determination component 404 may be taken by a user.

The ranking and display component may rank the notifications identified by the entry identification component 402 and then display a certain predetermined number of notifications based on the ranking. For example, in some aspects, the number of notifications displayed may be based on a size of a window displaying the notifications on the user's screen.

As is understood by skilled artisans in the relevant computer and Internet-related arts, each functional component illustrated in FIG. 4 may be implemented using hardware (e.g., a processor of a machine) or a combination of logic (e.g., executable software instructions) and hardware (e.g., memory and the processor of a machine) for executing the logic. For example, any component included as part of the feed system 208 may physically include an arrangement of one or more processors 410 (e.g., a subset of or among one or more processors of a machine) configured to perform the operations described herein for that component. As another example, any component of the feed system 208 may include software, hardware, or both, that configure an arrangement of the one or more processors 410 to perform the operations described herein for that component. Accordingly, different components of the feed system 208 may include and configure different arrangements of such processors 410 or a single arrangement of such processors 410 at different points in time.

Furthermore, the various functional components depicted in FIG. 4 may reside on a single machine (e.g., a client device or a server) or may be distributed across several machines in various arrangements such as cloud-based architectures. Moreover, any two or more of these components may be combined into a single component, and the functions described herein for a single component may be subdivided among multiple components. Functional details of these components are described below with respect to FIGS. 5-17.

Figure 5:
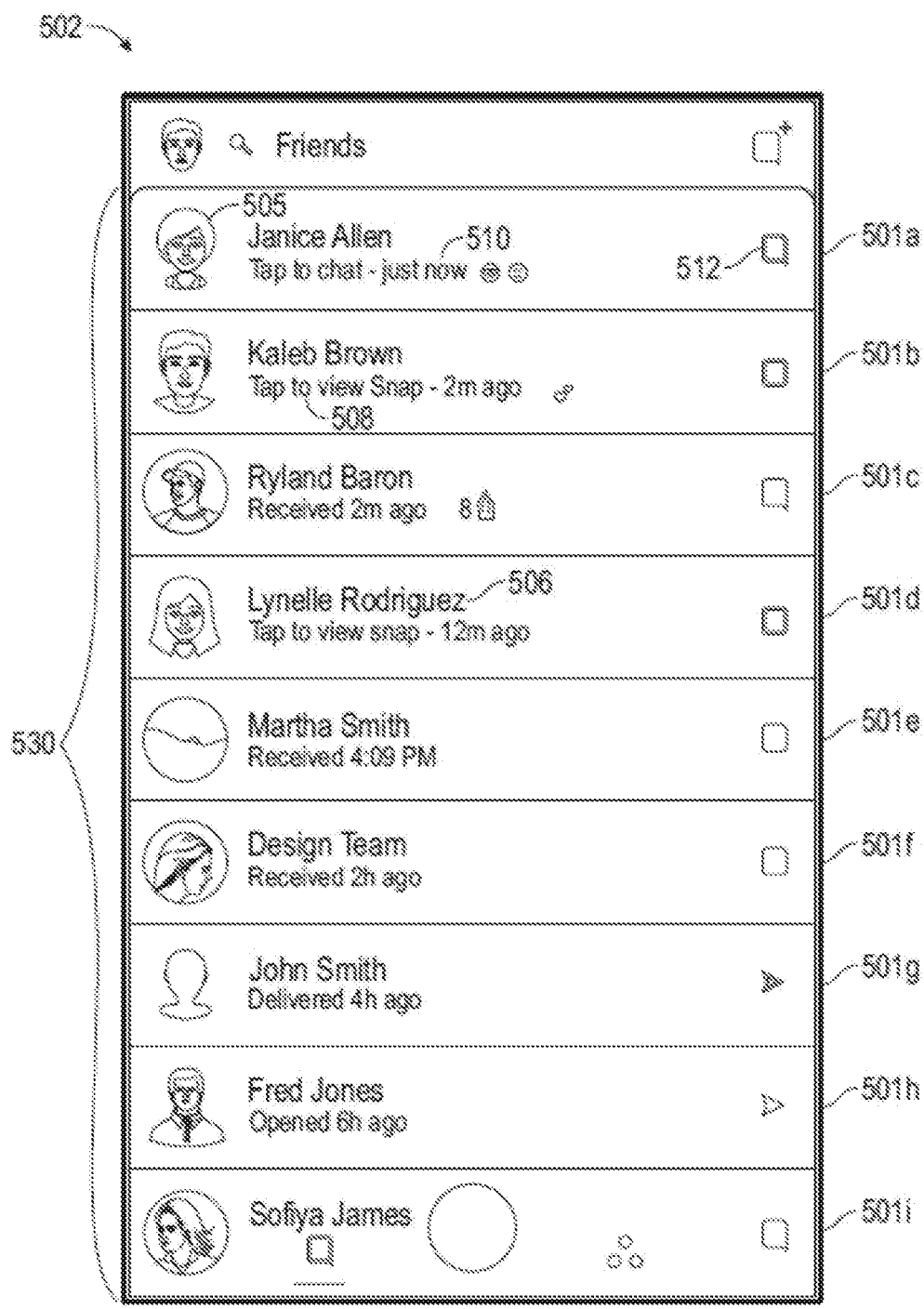
FIG. 5 is an example of a feed that may be implemented by one or more embodiments of this disclosure.

FIG. 5 is an example of a feed that may be implemented by one or more embodiments of this disclosure. The feed 502 includes a plurality of entries or notifications 501a-i. In some aspects, each of the entries 501a-i may be represented by a row in the feed table 360, discussed above with respect to FIG. 3B. In these aspects, each of the notifications 501a-i may have an equivalent feed identifier 352 and an equivalent user identifier 354, since they are displayed to a single user in this feed. The order of the entries 501a-i in FIG. 5 may be defined by the rank column 366 in some aspects.

In the embodiment of FIG. 5, each entry includes content, which may be stored in the entry table 380 discussed above with respect to FIG. 3C. The content includes an icon 505 (e.g. entry icon 353), a name 506, an action type identifier 508, a time indication 510, and a secondary type identifier 512. The icon 505 is a graphic that uniquely identifies a source of the notification in a graphical way. The name 506 identifies the source via an assigned name. The action type identifier 508 identifies a type of action that will be taken if the corresponding notification selected. For example, the action type identifier 508 may indicate that the social network user can chat with a friend that is the source of the notification, view an image or video posted by the friend, or other actions. The feed 502 also includes a secondary action type identifier 512, that graphically illustrates the type of action associated with the particular entry 501a-i in the feed 502. Embodiments of this disclosure may determine a sequence, rank, or order 530 of the various notifications 501a-n of the feed 502. Feeds in other embodiments may include entries having a different structure and/or different contents that that illustrated in FIG. 5.

Figure 6:
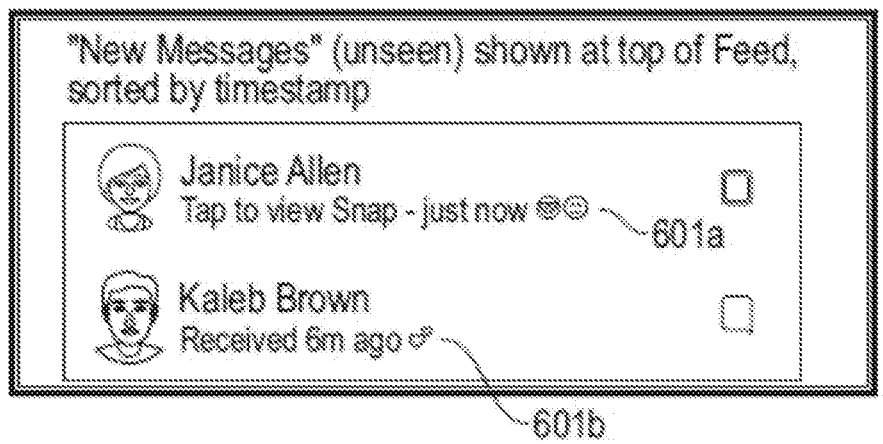
FIG. 6 shows an example of how notifications 501a-n of a feed may be ordered or ranked.
Figure 6:
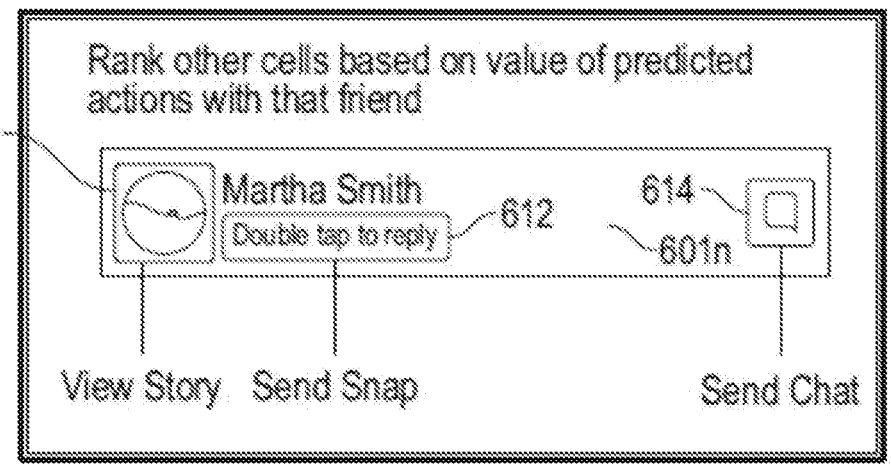

FIG. 6 shows an example of how notifications 501a-n of a feed may be ordered or ranked. A first portion 602a and a second portion 602b of the feed are shown. Entries included in the first portion 602a and second portion 602b may be stored in the feed table 360 with the same feed identifier 362. Entries in the first portion 602a and second portion 602b may be stored in the feed table 360 with different portion identifiers 365 in some aspects.

The first portion 602a illustrates how new notifications or entries 601a-b (entries having a creation or transmission date that is within a threshold time period of a current time—or meets one or more first criterion) may be shown at a top of the feed. New notifications or entries may be sorted from most recent (at the top) to less recent in some aspects.

Portion 602b shows how notifications older than a predetermined threshold (or meeting a second criterion) may be ranked differently than notifications newer than the predetermined threshold (or meeting a second criteria). While notifications in the first portion may be ranked, in some aspects, solely on modification date (or creation date), notifications in the second portion 602 may be ranked, in various embodiments, on additional or other criteria. For example, in some aspects, notifications in the second portion may be ranked based on one or more actions that may be taken from the notification. As shown in the portion 602b, the entry 601n may accept multiple types of actions. A first action may take the user to a story of the user of the entry 601n. This action is chosen by selecting an icon 610. Alternatively, another action is to reply to the user via the action designation 612. A third action, such as initiating a chat session with a user identified by the entry 601n, may be invoked by selecting an icon 614.

In some aspects, each of these actions may be assigned a weight. The weights may then be added to generate a score for the entry 601n. The score may be compared to scores of other entries (not shown) to determine where the entry 601n is placed within the portion 602b. A certain number of top ranked entries may then be selected for display within the feed from the portion 602b.

Figure 7:
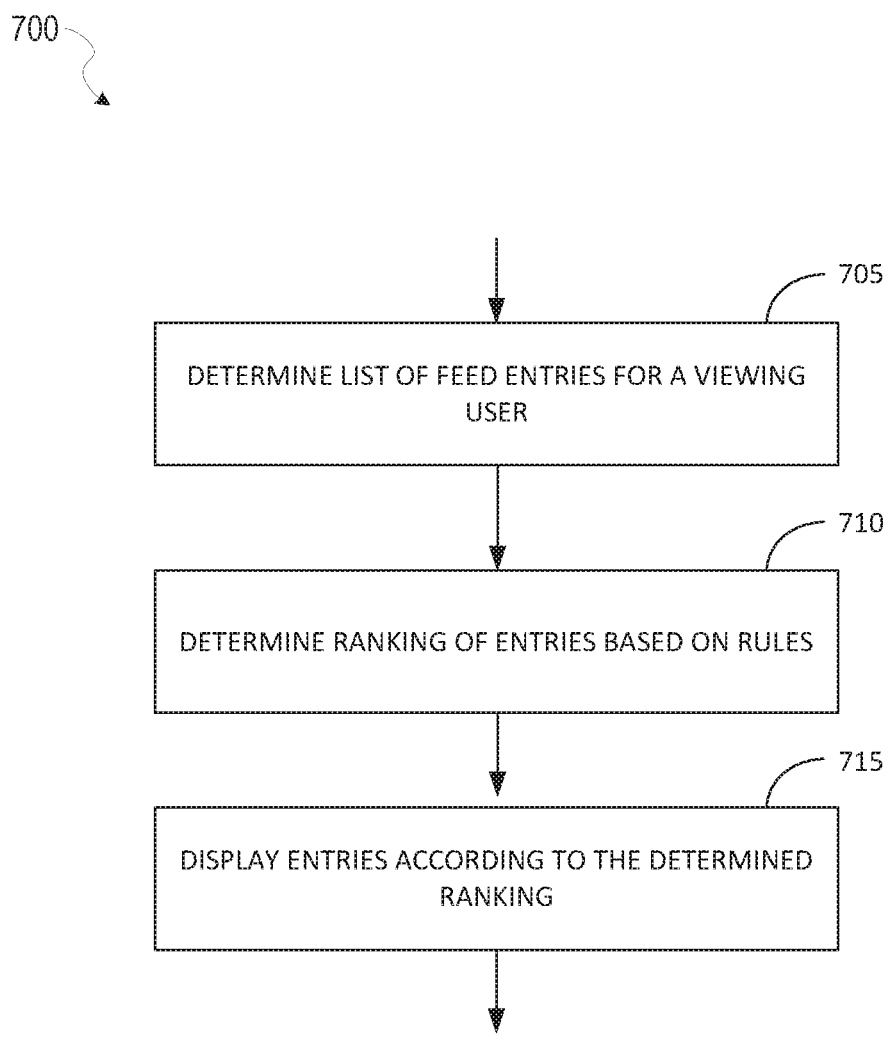
FIG. 7 is a flowchart of a method for displaying a feed.

FIG. 7 is a flowchart of a method for displaying a feed. In some aspects, one or more of the functions discussed below may be performed by one or more of the processors 410 of FIG. 4, discussed above.

In block 705, a list of feed notifications or entries are determined for a viewing user. The viewing user may be a user viewing the feed, or a user to which the feed is presented. In some aspects, the feed may include indications of new or updated content from friends of the user. In some aspects, the feed may include indications of new or updated content for some non-friends of the viewing user. For example, non-friends that have initiated a chat or image with the viewing user may appear in the feed. Similarly, if the viewing user has initiated chat or image conversations with the non-friend, items related to these conversations may appear in the feed. In some aspects, the list of feed entries may be obtained from the feed table 360. For example, entries for a particular feed may be identified as those entries having a particular feed identifier 362. If process 700 is ranking a portion of the feed, the entries identified may also have a common portion identifier 365.

In block 710, the notifications or entries are ranked based on one or more rules. In some aspects of block 710, a rule may determine a network status of an entry. For example, in some aspects a user may initiate communication with a second user, but that communication may fail for a variety of reasons. For example, network connectivity between the user's device and the friend's device may not be operable at a time when the communication was initiated. Thus, an error message may be generated. These error notification messages may, in some aspects, be displayed at a top of the feed. In other words, a ranking value that is above a predetermined value may be assigned to the error notifications in the feed. In some aspects, block 710 determines whether the failure is permanent. If block 710 determines the failure is permanent, then an entry may be removed from the feed.

In some aspects, new, unread notifications or entries may be displayed next in the feed. These new, unread notifications may be sorted from most recent to least recent in the feed. These messages may include one or more of chats, images, new friend notifications, read receipts, sent messages, screenshots, saves, streak ending states, group name changes, group adds, and group story posts. In some aspects, block 710 may only consider a message as a new message for a predetermined number of impressions. The number of impressions may vary by type of entry in some aspects. For example, in some aspects, a chat or image may be considered new until they have three (3) or more impressions. New friend notifications may be new until they reach five (5) impressions in some aspects. In some aspects, if the new friend notifications reach 48 hours or more, they may transition from being considered new to being considered not new. Some notifications may only be considered new until they reach one (1) impression. For example, in some aspects, one or more of read receipts, screenshots, saves, group name changes, and group adds are considered new until they have reached one entry impression. In some aspects, streak ending notifications are always considered new regardless of the number of impressions. In some aspects, an impression is recorded any time a user leaves a friend's portion of the social networking application.

In some aspects, notifications or entries not ranked via the above rules may be a variety of other riles. In some aspects, friends following a user may not have their posted stories boosted or ranked when posted if the user has set a messaging privacy setting to "public." In some aspects, if the user has their messaging privacy setting set to "private,", these users will be displayed on the feed if a communication such as a chat or image is initiated with this user. These messages may be displayed as "pending." Stories for these users may be included in the friend feed ranking. These stories will be deprioritized in the ranking after one impression or after the story is watched.

In some aspects, other friends may have no new messages or a new message with more than three impressions. In various aspects, these friends may be ordered by a most recent conversation time. Other remaining friends may be ordered by a best friends score. Friends that still remain may be ordered by a stories engagement ranking. This may be based on an update time. Any remaining friends may be ordered by a combination of best friends score and stories engagement ranking. In some aspects, a ranking of new friends may get a boost in a stories engagement ranking since a lack of prior engagement with their story would otherwise leave them near or at the bottom of the ranking. In some aspects, a friend's ranking may be affected by one or more of whether it is the friends birthday, whether a streak of the viewing user is running out with the friend, whether the viewing user did not respond to a friend with which the viewing user generally does respond to, the friend initiated a conversation but the viewing user did not respond, if the viewing user saved a chat without responding. This may indicate the viewing user intended to come back to the chat to respond. In some aspects, a ranking of a friend with a great story may be incremented, even if the viewing user does not typically view stories from that friend. In some aspects, a ranking of a friend may be increased if the friends story is being screenshotted or being replied to more frequently than typical stories. In some aspects, a friend's ranking may be based on whether the friend recently became a best friend, or recently became a best friends forever (BFF). One or more of the following transitions of a friend may change a ranking of content provided by the friend: from not best friend to best friend, from best friend to besties, from besties to best friends forever, from best friends forever to super best friends forever, from not mutual besties to mutual besties, from not mutual best friends to mutual best friends.

In some aspects, a friend's ranking may be based on one or more of the following: if a conversation with the friend is cleared by the viewing user, that conversation should be removed from the feed.

If a viewing user clears a conversation, notifications relating to the conversation should be removed from the viewing user's feed. In some aspects, after a conversation is cleared, that entry will not be increased in ranking based on any story post or any other non-direct communication reason. This prohibition on ranking the entry should be reset, however, in response to a first communication with the friend, for example, if the viewing user image's or chats with the friend. The prohibition is NOT reset when the friend images or chats the viewing user. Instead, when the viewing user actively communicates with the friend, the friend may be ranked again based on non-communication behavior (e.g., story posting). In some aspects, even if the viewing user has cleared a conversation, the entry will reappear at the top of the friend feed when the friend images or chats the viewing user or the viewing user images or chats the friend.

In some aspects, the ranking may be based on whether the viewing user has unfriended a friend. In this case, the friend's entry may be immediately from the viewing user's friend feed.

In some aspects, a ranking of a friend may be based on whether the viewing user has reported the friend. In some aspects, the ranking of the user or friend should operate as described above for cleared conversations, where notifications for the friend or user are not ranked until the viewing user has actively chatted or exchanged images with the user or friend. In some aspects, if a user has been reported by the viewing user, an entry for the reported user or friend may appear at a top of the friend feed for the viewing user when the user or friend images or chats the viewing user, or the viewing user images or chats with the user or friend.

In some aspects, ranking of a user who is not a friend and the user is set to chat private, a ranking of notifications for the user should be lowered. In some aspects, if the viewing user has an incoming audio or video call, an entry for friends should stay at the top of the feed other than for new messages that arrive while the call is ringing. In some aspects, after the viewing user has read a Team image or Chat, a ranking of notifications for the team may be reduced.

In some aspects, a ranking of a user or friends entry may be based on one or more of a number of images sent by the user, a number of chats sent by the user, a number of images viewed by the user, a number of chats viewed by the user, a number of stories viewed per user from the user's feed, a percentage of user images that are opened, a percentage of user chats that are opened, a number of images received from the user, a number of chats received from the user, a time before an image is opened, a time before a chat is opened, a percentage of stories the viewing user watches each day, a number of streaks that end on a day, whether a chat or image is initiated from the feed, empty cell impressions of no-chat users, direct reply images sent from a feed, a percentage of read receipts visible to the viewing user, and a number of available stories over a previous predetermined time period.

In block 715, the notifications or entries are displayed according to the ranking. For example, block 715 may generate a feed display in the same manner as the example of FIG. 5, discussed above.

Figure 8:
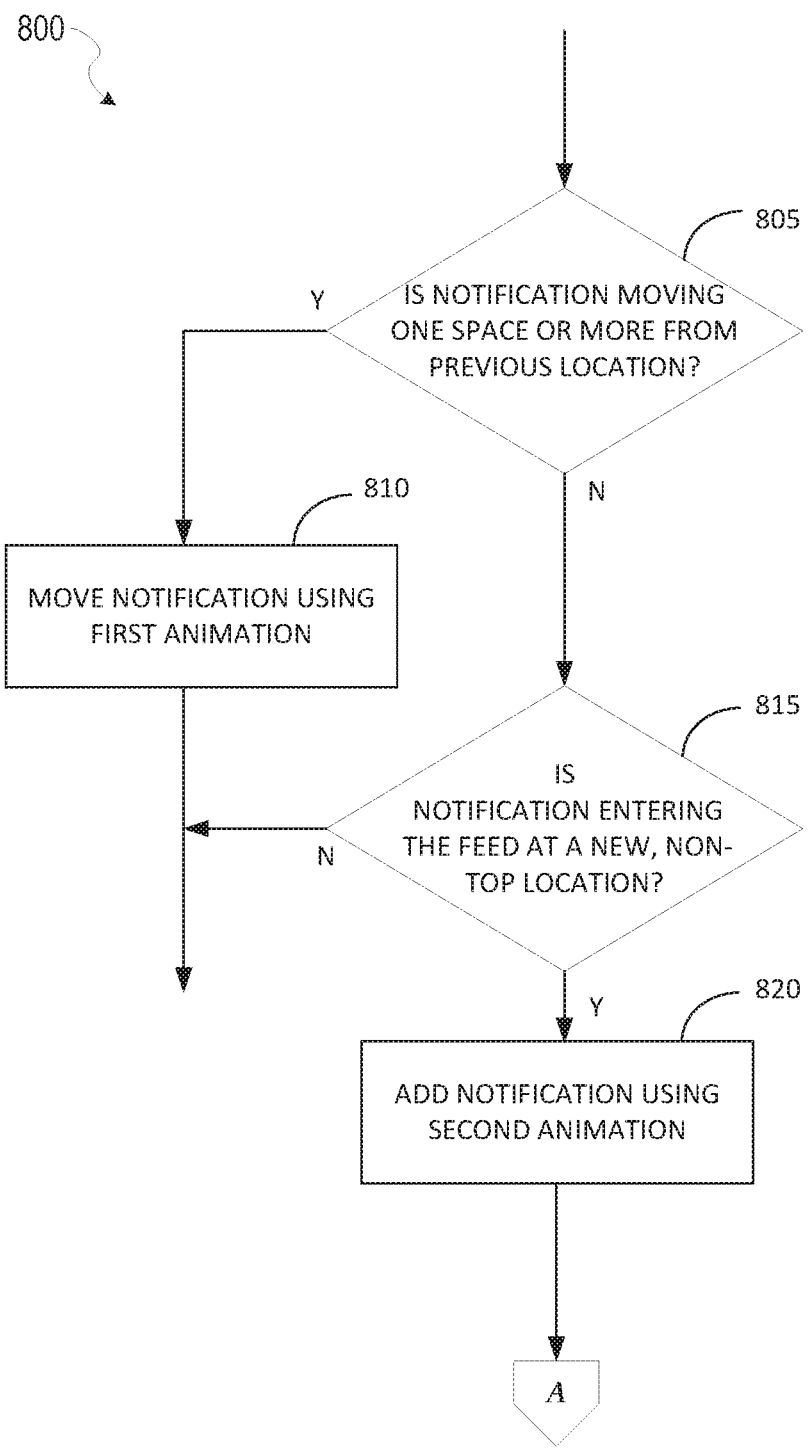
FIGS. 8-9 is a flowchart of a method of determining an animation for display of an entry in a feed.

FIG. 8 is a flowchart of a method of determining an animation for display of an entry into a feed. In some aspects, one or more of the functions discussed below with respect to FIG. 8 may be performed by the processor(s) 410. Block 805 determines whether an entry is moving one or more space in the feed from a previous location of the entry. If it is, then process 800 moves to block 810, which performs a first animation when moving the entry.

If not, process 800 moves to decision block 815, which determines whether the entry is entering the feed to a new, non-top location. If it is, a second animation is performed to introduce the entry into the feed in block 820. Process 800 then moves through off page transition "A" to FIG. 9.

Figure 9:
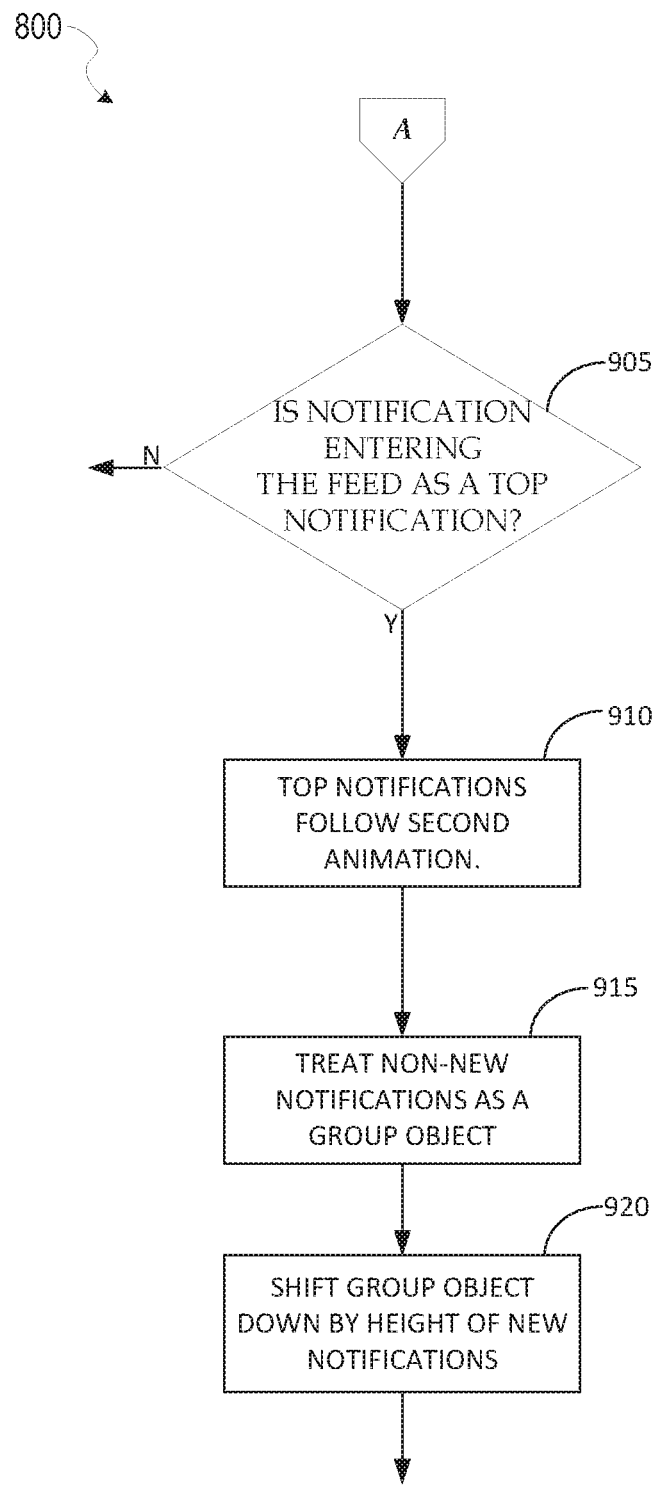

In FIG. 9, block 905 determines whether the entry is entering the feed as a top entry. If it is, process 800 moves to block 910, which follows the second animation discussed above with respect to block 820 above, to introduce the entry. In block 915, non-new entries or notifications are treated as a group object, and are shifted down in block 920 by a height of the new top notifications. In other words, notifications or entries that preexisted the new entries or notifications are "scrolled down" within a display window that is displaying the feed. This scroll down operation makes room for the new notifications or entries that are being placed at the top of the display window.

Figure 10:
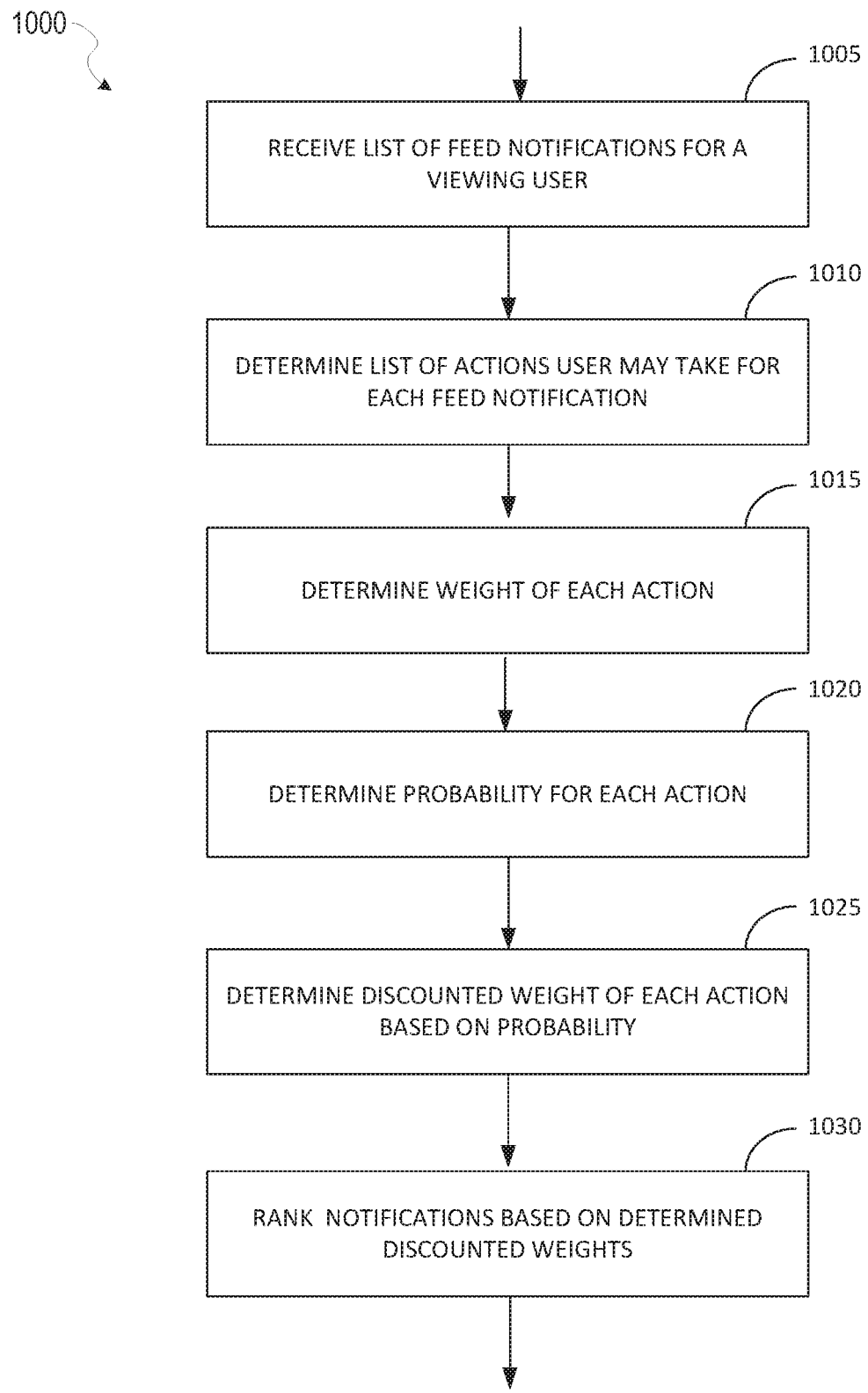
FIG. 10 is a flowchart of an example method for displaying a feed.

FIG. 10 is a flowchart of an example method for displaying a feed. In some aspects, one or more of the functions discussed below with respect to FIG. 10 may be performed by the processors 410.

In block 1005, a list of feed notifications or entries for a viewing user is received. In some aspects, block 1005 may include one or more of the functions discussed above with respect to block 705.

In block 1010, a list of actions that the viewing user may take upon viewing each received entry is determined. For example, as discussed above with respect to FIG. 3C and FIG. 6, in some aspects, an entry may provide for one or more actions to be taken. As shown with respect to FIG. 3C and the entry table 380, each entry may be associated with one or more actions. Thus, in some aspects, block 1010 may read an entry in the entry table 380 to determine the list of actions.

In blocks 1015 and 1020, a value and probability of each action is determined. In some aspects, machine learning algorithms may be used to determine the value. For example, in some aspects, actions taken by users when previous entries were displayed may be recorded in a historical response database. A value may be associated with each of those previous actions. In some aspects, the value may be determined based on a first value to the viewing user, and a second value to a second user, such as a user associated with the entry (e.g. a user that generated content included in or referenced by the entry). From this information, a machine learning algorithm may determine a probability and/or a value for each of the possible actions for an entry identified in block 1005.

In block 1025, a discounted value for each action may be determined based on the value and the probability. For example, in some aspects, the discounted value may be obtained by multiplying the probability of the action occurring by the value of the action should it occur.

In block 1030, notifications in the feed are ranked based on the determined discounted values. In some aspects, entries are ranked in order of the discounted values, with the entries having the highest discounted values receiving the highest relative ranking. Block 1030 may also include displaying a window including the entries based on the ranking. For example, in some aspects, a display window may be populated with the highest ranked entries. A scroll down operation within the window may reveal, at the bottom of the window, progressively lower ranked entries, with the highest ranked entries scrolling up and out of the top of the display window as the user scrolls down.

Figure 11:
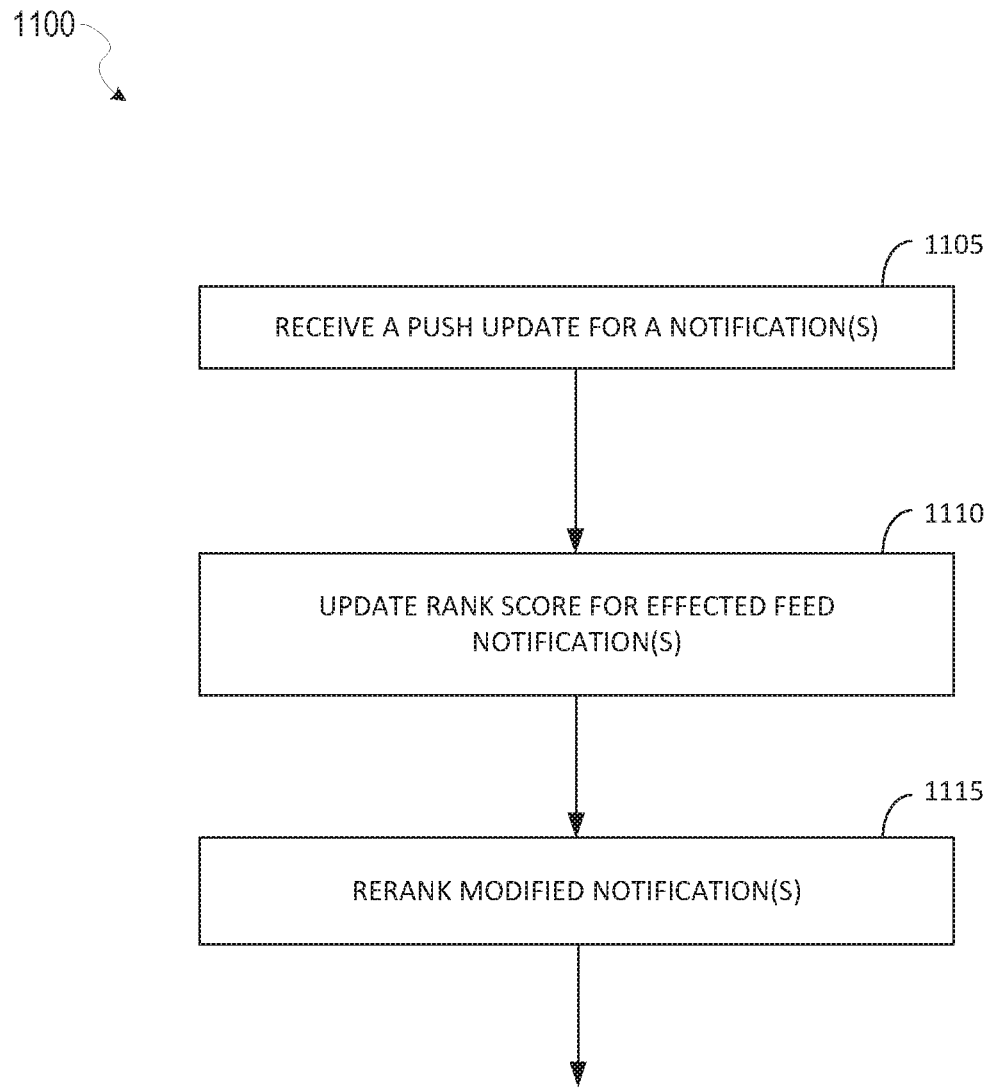
FIG. 11 is a flowchart of a method of updating notifications in a feed

FIG. 11 is a flowchart of a method of updating notifications or entries in a feed. In some aspects, one or more of the functions discussed below with respect to FIG. 11 may be performed by the processors 410.

In block 1105, a push update is received. The push update indicates a user who generated content that is represented by an entry in a feed has updated information associated with the entry. In block 1110, a ranking score for the entry is updated. The ranking score may be updated based on the push update. In block 1115, the updated entry is reranked, and the feed is redisplayed based on the update. Other notifications in the feed are not re-ranked in some aspects. In some aspects, a rerank may not occur when an image is sent to a friend's feed. Instead, only the friend to which the image was sent may be reranked. In some aspects, a reranking may not occur when any action in the feed or chat or a chat hamburger is performed. In some aspects, a rerank may not occur if a social messaging application is moved to the background and then returned, and the application displays the feed. A reranking may also not occur if the application is placed in the foreground from the friends feed.

Figure 12:
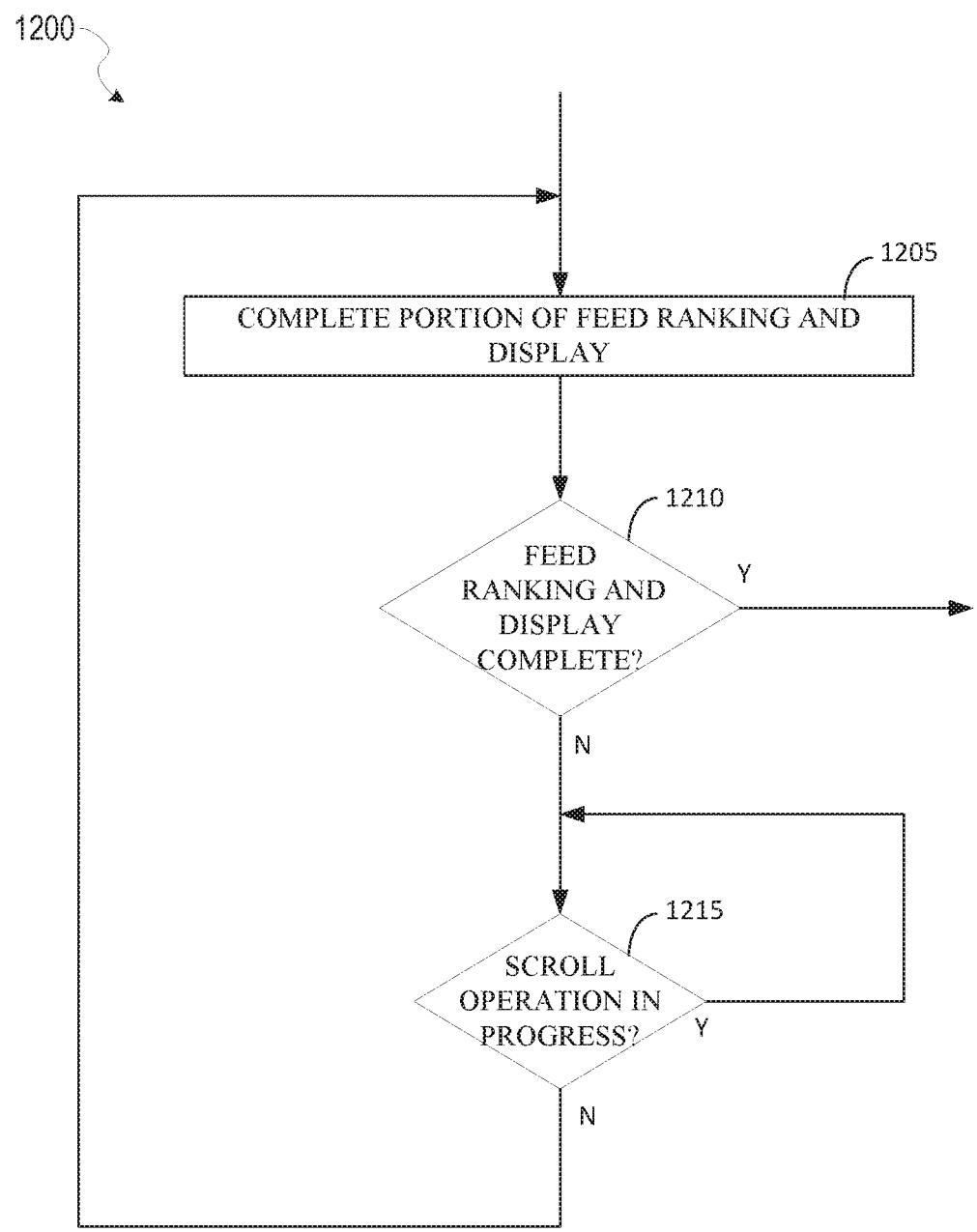
FIG. 12 is a flowchart of a method for reranking a feed while a user is scrolling through the feed

FIG. 12 is a flowchart of a method for reranking a feed while a user is scrolling through the feed. In some aspects, one or more of the functions discussed below with respect to FIG. 12 are performed by the processor(s) 410.

In block 1205, a portion of a feed is ranked and displayed. The feed may include a plurality of entries, such as entries represented by the entry table 380 and/or shown in FIG. 5 as example entries 501*a-i*. If the feed has n entries, block 1205 represents a number of entries at least less than n. In some aspects, block 1205 may rank a predefined percentage of the n entries.

Decision block 1210 determines if the complete feed has been ranked and displayed. For example, the iterative nature of process 1200 may provide for complete ranking of all entries within a feed after multiple iterations, even if block 1205 is ranking only a portion of the entries during each iteration.

If all entries have not yet been ranked, process 1200 moves to decision block 1215, which determines whether the user is scrolling through the feed. If the user is scrolling, process 1200 waits until the scroll operation is complete. Whether the user is scrolling may be based on whether a scroll input has been received within a threshold period of time, and/or whether the user is actively selecting a scroll control for a display window displaying the feed. For example, if a user is "holding" the scroll bar with a mouse control, even if they are not actively moving the scroll bar, this may be considered to be an in progress scroll operation. Alternatively, even if no scroll input is currently occurring, but one has occurred within some threshold period of time, a scroll operation may be considered to be in progress. If no scroll input is received with the threshold period of time, then some embodiments may determine that a scroll operation is not in progress.

Upon completion of the scroll, process 1200 returns to block 1205, where a different portion of the feed is ranked and displayed. Process 1200 may then iteratively continue to check, via decision block 1215 if the user is scrolling, and wait to continue the ranking operation until the scroll has completed.

Software Architecture

Figure 13:
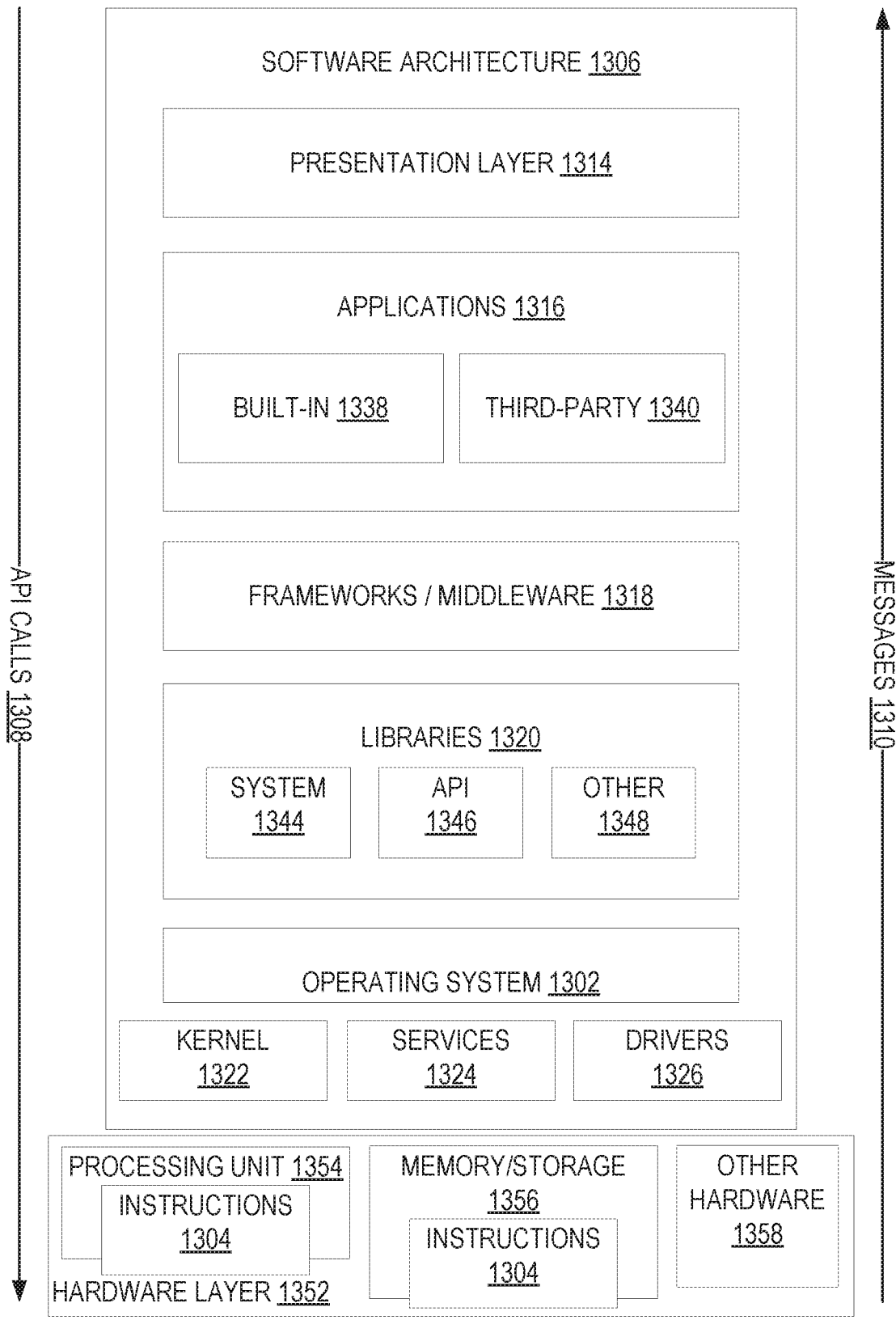
FIG. 13 is a block diagram illustrating a representative software architecture, which may be used in conjunction with various hardware architectures herein described.

FIG. 13 is a block diagram illustrating an example software architecture 1306, which may be used in conjunction with various hardware architectures herein described. FIG. 13 is a non-limiting example of a software architecture and it will be appreciated that many other architectures may be implemented to facilitate the functionality described herein. The software architecture 1306 may execute on hardware such as a machine 1400 of FIG. 14 that includes, among other things, processors 1404, memory/storage 1406, and I/O components 1418. A representative hardware layer 1452 is illustrated and can represent, for example, the machine 1400 of FIG. 14. The representative hardware layer 1352 includes a processing unit 1354 having associated executable instructions 1304. The executable instructions 1304 represent the executable instructions of the software architecture 1306, including implementation of the methods, components, and so forth described herein. The hardware layer 1352 also includes memory and/or storage 1356, which also have the executable instructions 1304. The hardware layer 1352 may also comprise other hardware 1358.

As used herein, the term "component" may refer to a device, a physical entity, or logic having boundaries defined by function or subroutine calls, branch points, APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein. "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 13, the software architecture 1306 may be conceptualized as a stack of layers where each layer provides particular functionality. For example, the software architecture 1306 may include layers such as an operating system 1302, libraries 1320, frameworks/middleware 1318, applications 1316, and a presentation layer 1314. Operationally, the applications 1316 and/or other components within the layers may invoke API calls 1308 through the software stack and receive a response as messages 1310. The layers illustrated are representative in nature and not all software architectures have all layers. For example, some mobile or special-purpose operating systems may not provide a frameworks/middleware 1318 layer, while others may provide such a layer. Other software architectures may include additional or different layers.

The operating system 1302 may manage hardware resources and provide common services. The operating system 1302 may include, for example, a kernel 1322, services 1324, and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers

1326 include display drivers, camera drivers. Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1320 provide a common infrastructure that is used by the applications 1316 and/or other components and/or layers. The libraries 1320 provide functionality that allows other software components to perform tasks in an easier fashion than by interfacing directly with the underlying operating system 1302 functionality (e.g., kernel 1322, services 1324, and/or drivers 1326). The libraries 1320 may include system libraries 1344 (e.g., C standard library) that may provide functions such as memory allocation functions, string manipulation functions, mathematical functions, and the like. In addition, the libraries 1320 may include API libraries 1346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1316 and other software components/modules.

The frameworks/middleware 1318 provide a higher-level common infrastructure that may be used by the applications 1316 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1316 and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. The third-party applications 1340 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1340 may invoke the API calls 1308 provided by the mobile operating system (such as the operating system 1302) to facilitate functionality described herein.

The applications 1316 may use built-in operating system functions (e.g., kernel 1322, services 1324, and/or drivers 1326), libraries 1320, and frameworks/middleware 1318 to create user interfaces to interact with users of the system. Alternatively, or additionally, in some systems interactions with a user may occur through a presentation layer, such as the presentation layer 1314. In these systems, the application/component "logic" can be separated from the aspects of the application/component that interact with a user.

Exemplary Machine

Figure 14:
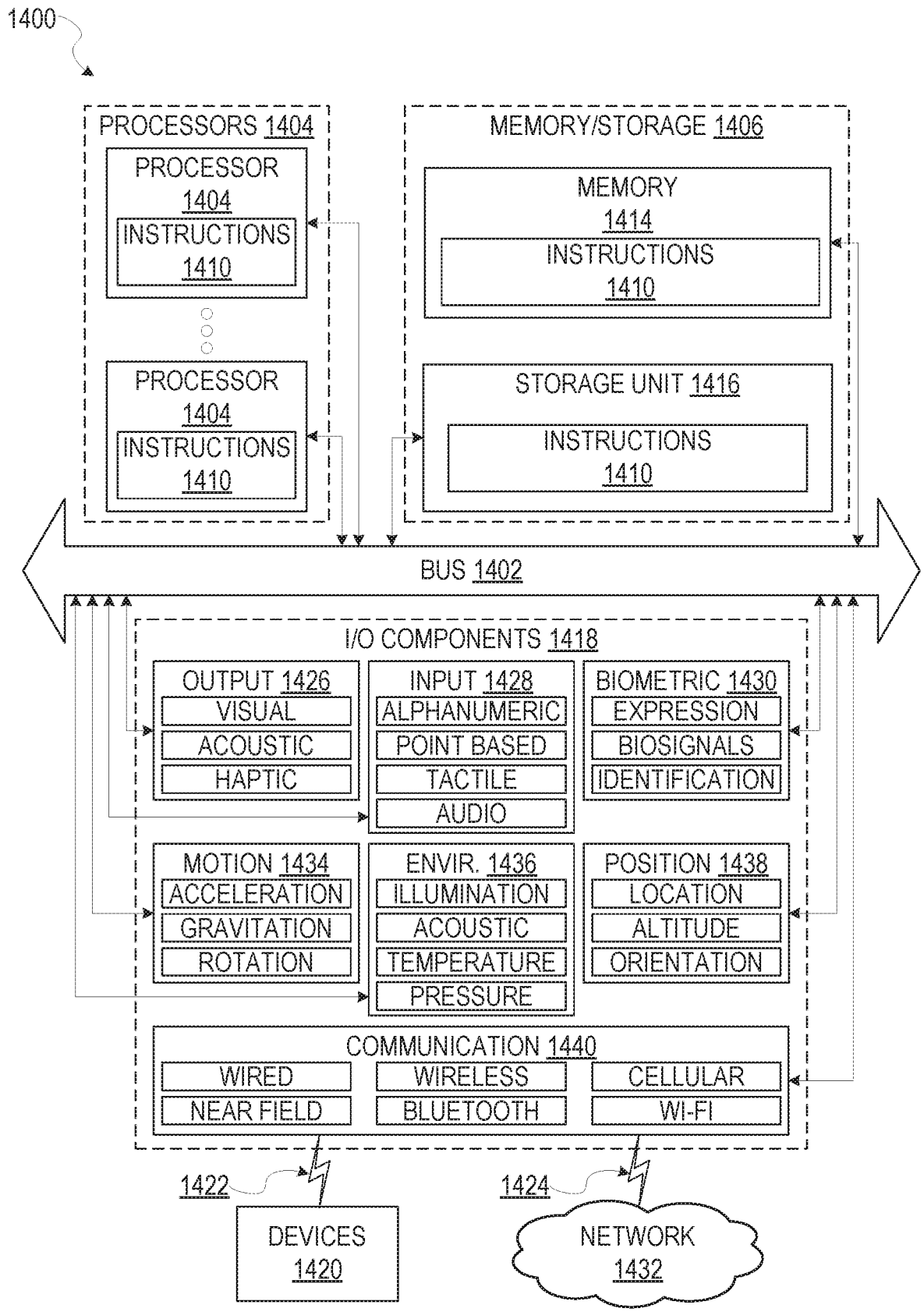
FIG. 14 is a block diagram illustrating components of a machine, according to some exemplary embodiments, able to read instructions from a machine-readable medium (e.g., a machine-readable storage medium) and perform any one or more of the methodologies discussed herein.

FIG. 14 is a block diagram illustrating components (also referred to herein as "modules") of a machine 1400, according to some exemplary embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1410 (e.g., software, a program, an application, an applet, an app, or other executable code) for causing the machine 1400 to perform any one or more of the methodologies discussed herein may be executed. As such, the instructions 1410 may be used to implement modules or components described herein. The instructions 1410 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1410, sequentially or otherwise, that specify actions to be taken by machine 1400. Further, while only a single machine 1400 is illustrated, the term "machine" shall also be taken to include a collection of machines that individually or jointly execute the instructions 1410 to perform any one or more of the methodologies discussed herein.

The machine 1400 may include processors 1404, memory/storage 1406, and I/O components 1418, which may be configured to communicate with each other such as via a bus 1402. The memory/storage 1406 may include a memory 1414, such as a main memory, or other memory storage, and a storage unit 1416, both accessible to the processors 1404 such as via the bus 1402. The storage unit 1416 and memory 1414 store the instructions 1410 embodying any one or more of the methodologies or functions described herein. The instructions 1410 may also reside, completely or partially, within the memory 1414, within the storage unit 1416, within at least one of the processors 1404 (e.g., within the processor's cache memory), or any suitable combination thereof, during execution thereof by the machine 1400. Accordingly, the memory 1414, the storage unit 1416, and the memory of the processors 1404 are examples of machine-readable media.

As used herein, the term "machine-readable medium," "computer-readable medium." or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium"

may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 1418 may include a wide variety of components to provide a user interface for receiving input, providing output, producing output, transmitting information, exchanging information, capturing measurements, and so on. The specific I/O components 1418 that are included in the user interface of a particular machine 1400 will depend on the type of machine. For example, portable machines such as mobile phones will likely include a touch input device or other such input mechanisms, while a headless server machine will likely not include such a touch input device. It will be appreciated that the I/O components 1418 may include many other components that are not shown in FIG. 14. The I/O components 1418 are grouped according to functionality merely for simplifying the following discussion and the grouping is in no way limiting. In various exemplary embodiments, the I/O components 1418 may include output components 1426 and input components 1428. The output components 1426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 1428 may also include one or more image-capturing devices, such as a digital camera for generating digital images and/or video.

In further exemplary embodiments, the I/O components 1418 may include biometric components 1430, motion components 1434, environment components 1436, or position components 1438, as well as a wide array of other components. For example, the biometric components 1430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1434 may include acceleration sensor components (e.g., accelerometer), gravitation sensor components, rotation sensor components (e.g., gyroscope), and so forth. The environment components 1436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1438 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1418 may include communication components 1440 operable to couple the machine 1400 to a network 1432 or devices 1420 via a coupling 1424 and a coupling 1422 respectively. For example, the communication components 1440 may include a network interface component or other suitable device to interface with the network 1432. In further examples, the communication components 1440 may include wired communication components, wireless communication components, cellular communication components, Near Field Communication (NFC) components, Bluetooth® components (e.g., Bluetooth® Low Energy). Wi-Fi® components, and other communication components to provide communication via other modalities. The devices 1420 may be another machine or any of a wide variety of peripheral devices (e.g., a peripheral device coupled via a USB).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code. Data Matrix. Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 1440, such as location via Internet Protocol (IP) geo-location, location via Wi-Fi® signal triangulation, location via detecting an NFC beacon signal that may indicate a particular location, and so forth.

Figure 15:
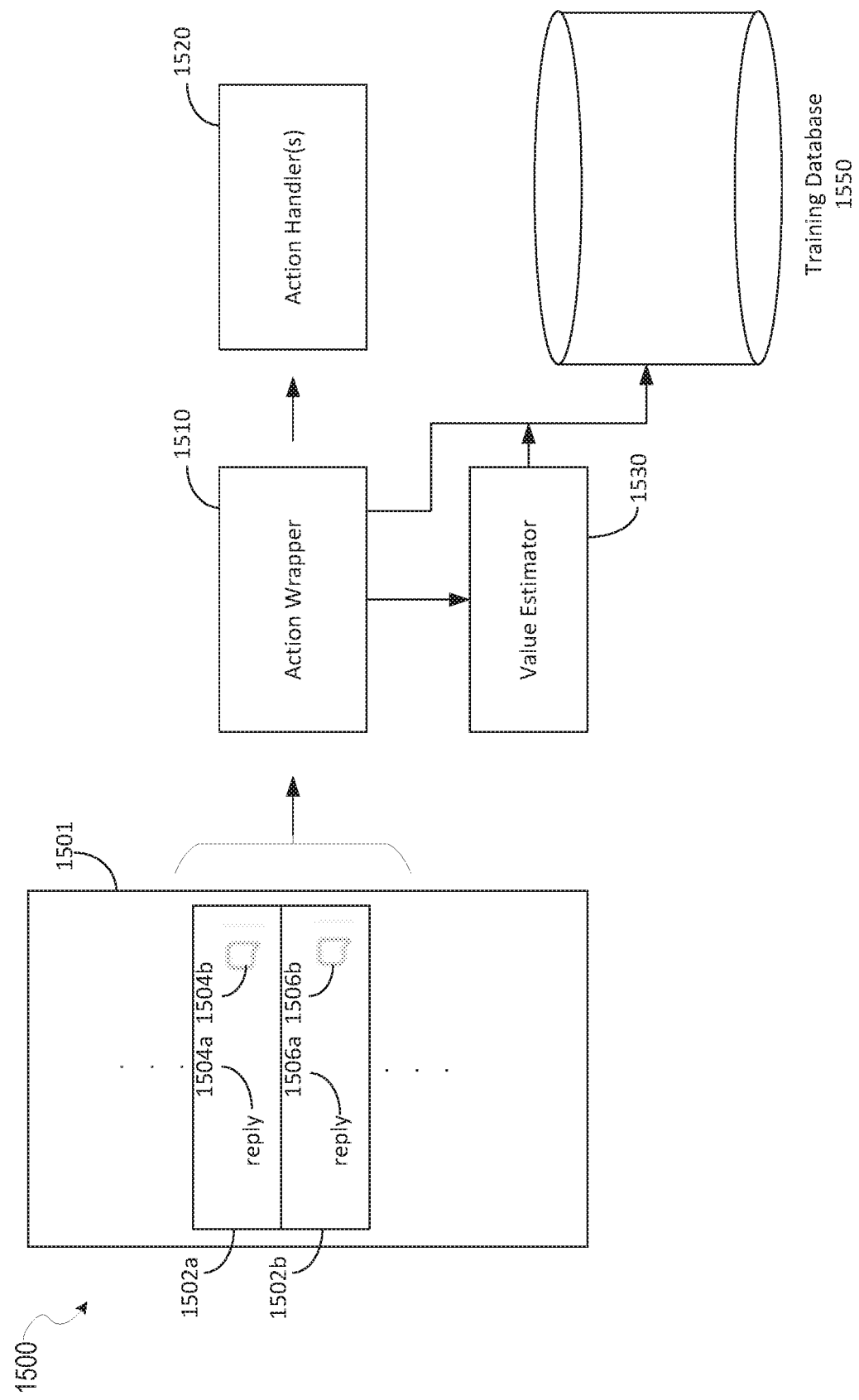
FIG. 15 shows a data flow that may be implemented in at least some of the disclosed embodiments.

FIG. 15 shows a data flow that may be implemented in at least some of the disclosed embodiments. The data flow 1500 of FIG. 15 provides for the capturing of results of display of entries in a feed. The results may then be used to train a machine learning model, which may provide information to select particular entries in the future for display, or at least to prioritize the display of certain entries over other entries.

Data flow 1500 shows a display window 1501 that is displaying a feed. The feed includes at least two entries 1502a and 1502b. Each of the entries 1502a and 1502b include two selectable actions, shown as 1504a-b and 1506a-b respectively. A user viewing the display window 1501 may select one of these actions upon viewing the feed. A message or other indication of the selection is provided to an action wrapper 1510. The action wrapper 1510 may store which entries are displayed in the display window 1501, which actions are available given those displayed entries, and store that information in a training database 15. Information indicating which particular action is selected may also be stored in the training database. The selected action causes the action wrapper 1510 to invoke an action handler 1520. As discussed above with respect to FIG. 3B, each entry in a feed, such as entries 1502*a-b*, may have an action handler associated with an action. For example, the action 1504*b* may have a chat application associated with it, while the action 1504*a* may have an email application associated with it. The action wrapper 1510 also passes an indication of the selected action to a value estimator 1530. The action wrapper 1510 may also store additional information in the training database 1550. For example, the action wrapper 1510 may store characteristics of a user to which the display window 1501 is displayed. These characteristics could include the users age, gender, or other demographic information. The action wrapper may also store channel characteristics of the display window 1501. For example, whether the display window 1501 is displayed as part of a news feed, friend feed, or other type of feed. Temporal characteristics of the feed and/or entries in the display window 1501 may also be stored in the training database. For example, a time of day, and/or day of year when the feed was displayed and/or an action selected by the user. One or more of the information described above as being stored in the training database may allow machine learning algorithms to identify similarities between feed entries encountered in the future and the results of displaying feed entries in the past.

The value estimator 1530 estimates a value of the selected action. The estimated value is then stored in the training database 1550, and associated with the other information stored for the entries 1502*a-b* displayed in the display window 1501.

Each of the action wrapper 1510, action handler(s) 1520, and value estimators 1530 may be comprised of instructions that configure hardware processing circuitry to perform the functions described above with respect to each of these items. In some aspects, the action wrapper and action handlers may execute on a client device 102, which may be running the messaging client application 104. The messaging client application 104 may include the action wrapper 1510 and action handlers 1520. The value estimator 1530 may also be included in the messaging client application 104 or alternatively may be part of the application server 112 in various aspects.

Figure 16:
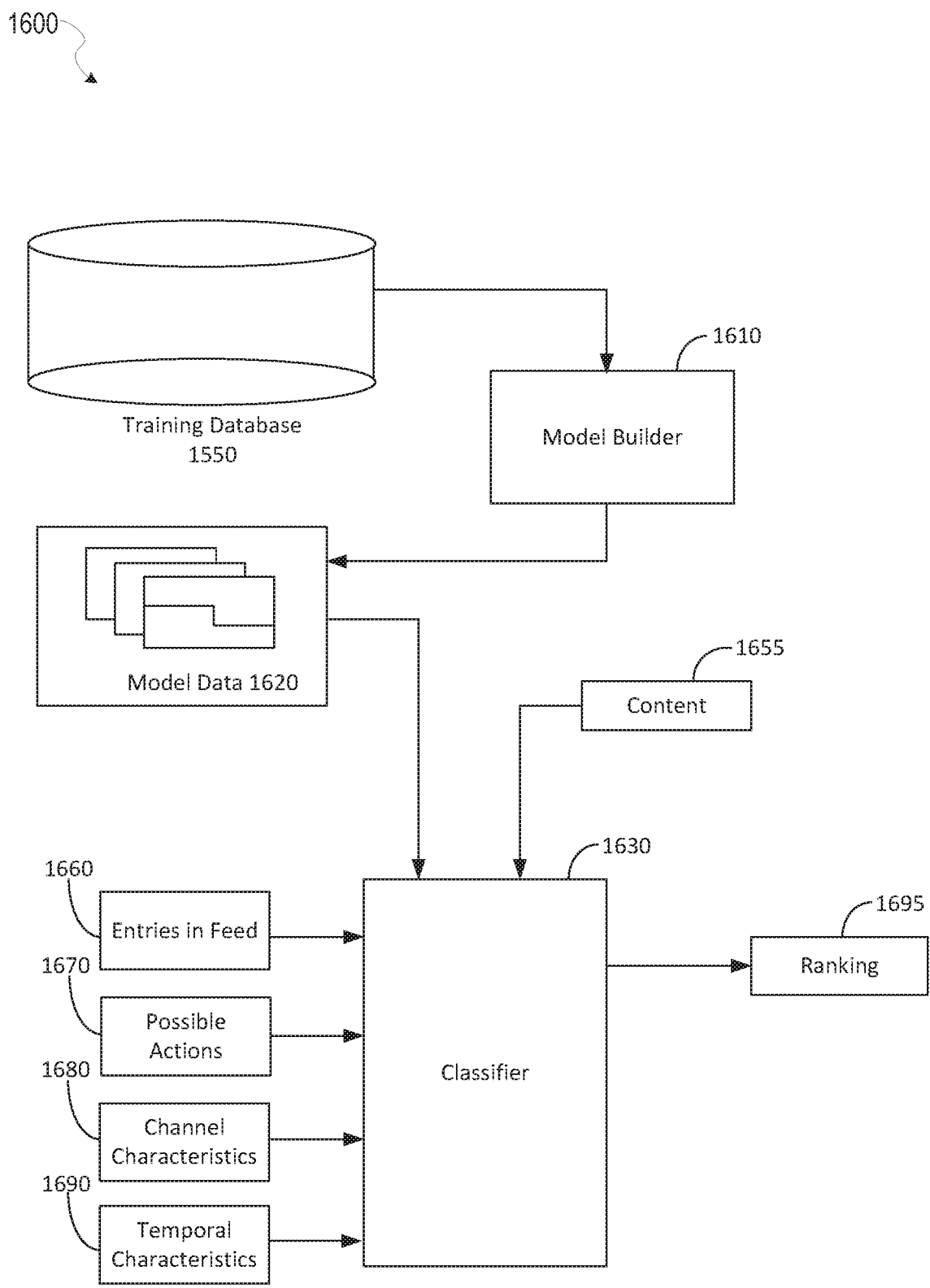
FIG. 16 is a data flow diagram illustrating how a model may be trained using the training database discussed above with respect to FIG. 15, and then used to rank entries in a feed.

FIG. 16 is a data flow diagram illustrating how a model may be trained using the training database discussed above with respect to FIG. 15, and then used to rank entries in a feed.

Data flow 1600 shows that the training database 1550 may be read by a model builder. Per the discussion above of data flow 1500, the training database 1550 may store information relating to entries that were included in feeds that were previously displayed. The information may include the type of entries displayed, their associated actions available for selection, and which actions were actually selected. The information may also include a value associated with the selected action. The model builder 1610 may process the information in the training database 1550 and generate model data 1620.

A classifier 1630 may read the model data to rank a plurality of entries in a feed 1660. The classifier may utilize any of the classification technologies known in the art. For example, in various aspects, the classifier may be implemented using neural networks, ID3. C4.5, Naïve Bayes, a statistical procedure based approach, K nearest neighbors algorithm, or other classification algorithms. Based on the entries 1660, the classifier 1630 may rank the entries to produce ranking 1695. The classifier 1630 may also receive as input the possible actions available 1670 from the entries 1660. The possible actions 1670 may be obtained, in some aspects, from an entry table (e.g., 380). For example, the entry table may store one or more possible actions $388_{1-n}$ for each entry. The classifier 1630 may also receive information on channel characteristics of where the feed may be displayed. Channel characteristics 1680 may include, for example, characteristics of a user to which the feed may be displayed, a type of channel in which the feed is displayed (for example, is the feed displayed in a news feed or in a friends feed), and temporal characteristics 1690, such as a time of day, season, day of year, or other temporal characteristics.

Figure 17:
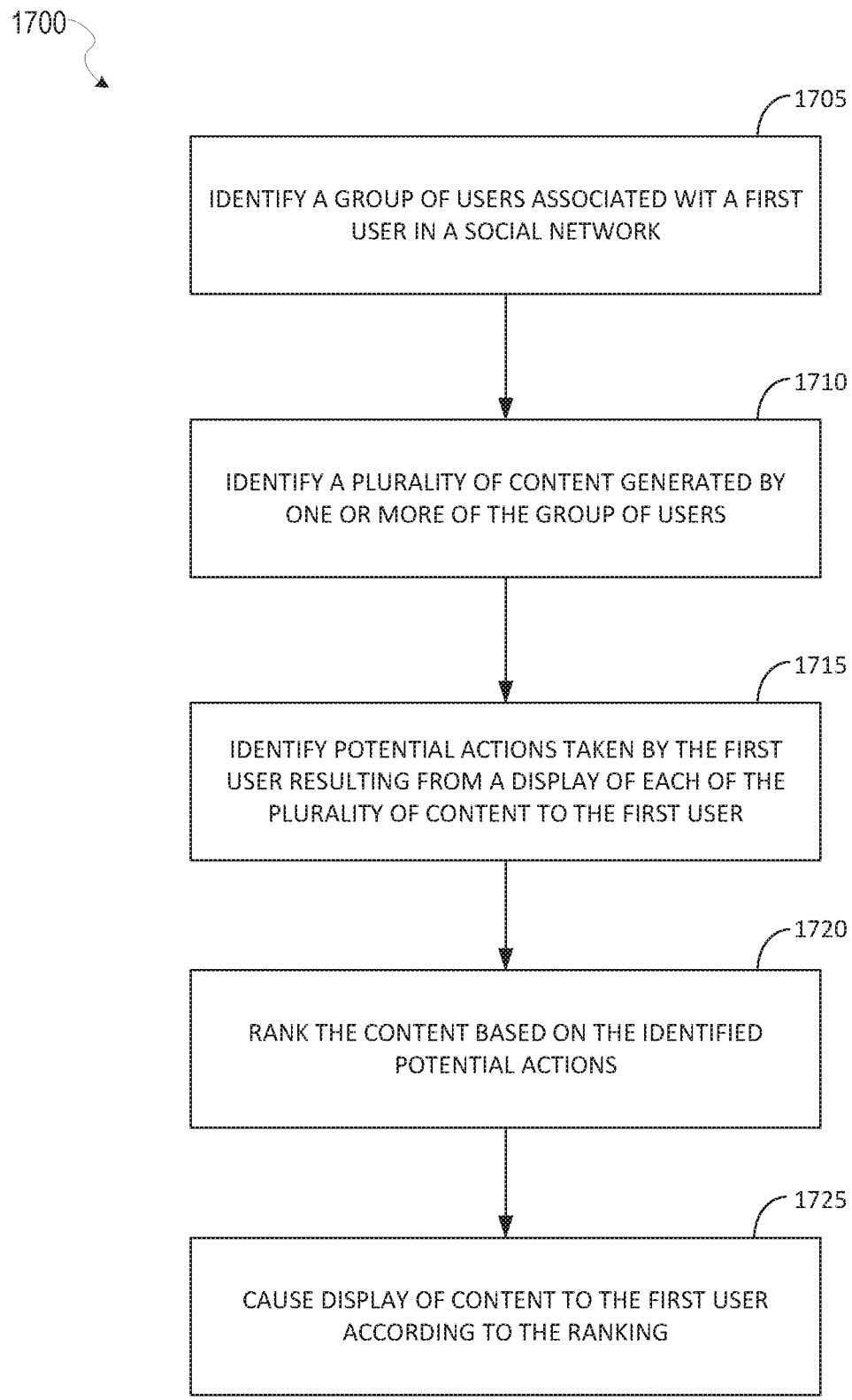
FIG. 17 is a flowchart of a method for ranking entries in a feed.

FIG. 17 is a flowchart of a method for ranking entries in a feed. In some aspects, one or more of the functions discussed below with respect to FIG. 17 and process 1700 may be performed by the processor(s) 410.

In block 1705, a group of user' accounts associated with a first user or first user account in a social network are identified. As discussed above, in some aspects, a relationship table 390 may store relationships between two user accounts. Thus, in some aspects, block 1705 may scan the relationship table 390 to identify a group of user accounts associated with the first user account via the relationship table 390. In some aspects, the group of users may be associated with the first user by being "friends" with the first user in a social network. Alternatively, the first user may be "following" the group of users having the respective group of user accounts. In some aspects, the group of users may be associated with the first user in that the first user has made a comment or "liked" content generated by each user account in the group of users. Many different types of association are possible between the group of users and their respective accounts, and the first user and their respective account.

In block 1710, content generated by one or more users of the group of users is identified. Content may include any data generated by the one or more users, but typically may comprise media data such as one or more images, videos, audio data, or gifs. In some aspects, content may include text content, such as an instant message or text email. For example, the one or more users of the group of users may have posted a message, image or video to the social network. The content generated by the users may be used to generate entries in an entry table, such as entry table 380, discussed above with respect to FIG. 3C. The content may be stored in the description field 384 in some aspects. Associated with each generated content may be one or more actions, for example, as shown in the entry table 380, each entry may have one or more associated actions, represented by 3861-*n*, 3881-*n*, and 3891-*n*.

Block 1715 identifies potential action taken by the first user that may result from display of each of the plurality of content. For example, as shown in the example feed of FIG. 5, each of 508, 510, and 512 are potential actions, which may be represented in the database 120 in some aspects via 3861-*n*, 3881-*n*, and 3891-*n*.

In block 1720, the content or entries storing the content are ranked based on the identified potential actions. For example, as discussed above, in some aspects, block 1720 may determine a probability that each action will be taken. The probability may be derived from historical information. For example, a database storing previous results of displaying feed entries with associated actions may be used to calculate a probability that an action of a particular type will be selected. This probability determination may also be based on previously displayed entries having actions of a similar type, but also having other similarities, such as similar user characteristics, similar channel characteristics (type of feed, etc.), and similar temporal characteristics. In some aspects, a trained classifier may be used to determine probabilities of particular actions being selected. A value may also be associated with each action. For example, in some aspects, the action value table 395 may provide a mapping between an action type and a value. The value of an action may then be discounted (e.g., multiplied) by the probability of the action occurring. The discounted values (e.g., weights) of the identified actions may then be used to rank the entries having the identified actions. In some aspects, an entry may be ranked based on the accumulated discounted value(s) (or weights) of its respective actions. For example, an entry having two possible actions will be ranked based on the sum of a first discounted value of a first action and a second discounted value of a second action.

In block 1725, display of the content, or entries including the content to the first user according to the determined ranking of block 1720 is performed. In some aspects, the display of content occurs within a context of a session that may be previously established with the first user account. For example, credentials for the first user account may be received from the first user to establish the session. In some aspects, causing display may be performed by a server side application, such as the social network system 116 or application server 112, on a client device 102 via the messaging client application. For example, causing display may include sending a message to the messaging client application, the message configured to cause the messaging client application to display the content or entries according to the determined ranking.

In some aspects, process 1700 may be performed multiple times for multiple groups of content or entries in a feed. As discussed above, in some aspects, a first portion of a feed may be ranked independently from a second portion of the feed. In some aspects, a first portion may be distinguished from a second portion based on a creation date of the content and/or entry. The second portion may be displayed below the first portion in a display window for a feed in some aspects. For example, content or entries created prior to a predetermined date/time may be included in the second portion while entries created after the predetermined date/time may be included in the first portion. Each entry in the first portion ranked relative to other entries/content in the first portion, and each entry/content in the second portion may be ranked relative to other entries/content in the second portion.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

We claim:

1. A method of generating a feed, comprising:
   identifying, via hardware processing circuitry, a group of user accounts associated with a first user account in a social network;
   identifying, via the hardware processing circuitry, content generated by one or more user accounts of the group of user accounts;
   identifying, via the hardware processing circuitry, potential actions associated with each of the identified content;
   ranking, via the hardware processing circuitry, the identified content based on the identified potential actions, the ranking comprising:
      within a same content feed comprising a plurality of content items, identifying a first plurality of content items associated with respective creation times that precede a current time by less than a threshold and a second plurality of content items associated with respective creation times that precede the current time by more than the threshold;
      ranking the first plurality of content items based on recency of the associated respective creation time of the first plurality of content items; and
      ranking the second plurality of content items based on the potential actions associated with the second plurality of content items instead of recency of the associated respective creation time, wherein the first plurality of content items are ranked higher within the same content feed than the second plurality of content items and based on a different criterion than the second plurality of content items;
   establishing, via the hardware processing circuitry, a session based on credentials associated with the first user account;
   causing, via the hardware processing circuitry, a display of the identified content via the session according to the ranking;
   determining a network status of each of the plurality of content items;
   receiving a request to initiate a communication between the first user account and a second user account;
   determining, based on the network status of each of the plurality of content items, that network connectivity between the first user account and the second user account is not operable in response to receiving the request; and
   generating an error message for display at a top of the content feed in response to determining that the network connectivity between the first user account and the second user account is not operable.

2. The method of claim 1, wherein the first plurality of content items is ranked solely based on the respective creation time of the first plurality of content items.

3. The method of claim 1, further comprising providing the identified content, and identified potential actions to a trained classifier, wherein the identified content is ranked based in part, on output generated by the classifier.

4. The method of claim 3, further comprising training a classifier based on a plurality of historical content, potential actions associated with the historical content, and indications of which of the potential actions was selected when the plurality of historical content and the associated actions were displayed, the classifier configured to determine a ranking for the identified content based on the training, wherein the ranking of the identified content is based on the ranking determined by the classifier.

5. The method of claim 4, further comprising training the classifier based on temporal characteristics of the historical content, and characteristics of historical users to which the plurality of historical content and associated actions were presented.

6. The method of claim 3, wherein the classifier is configured to determine the ranking based on characteristics of the first user account and further based on a time period during which the content is displayed.

7. The method of claim 1, further comprising:
determining a probability that each of the one or more potential actions may occur;
determining a weight of a first content of the identified content based on one or more probabilities for the one or more potential actions associated with the first content; and
ranking the first content based on the determined weight.

8. The method of claim 1, further comprising:
determining a first group of the identified content that meet a first criterion;
determining a second group of the identified content that meet a second criterion;
ranking the first group of content as a group;
ranking the second group of content as a second group;
ordering the first group of ranked content above the second group of ranked content; and
causing display of the content according to the order.

9. The method of claim 1, further comprising:
ranking a first portion of the identified content;
causing display of the ranked first portion of the identified content;
refraining from ranking a second portion of the identified content while a scroll operation of the displayed first portion of the identified content is in progress;
ranking a second portion of the identified content in response to a completion of the scroll operation; and
causing display of the ranked second portion of the identified content.

10. The method of claim 1, wherein a first content item of the identified content is configured to receive multiple types of actions comprising: a first action to access additional content of a creator of the first content item, a second action to reply to the creator; and a third action to initiate a chat session with the creator.

11. The method of claim 1, further comprising increasing a rank of a friend associated with a given content item of the plurality of content items in response to determining that a screenshot of the given content item has been captured.

12. The method of claim 1, further comprising:
assigning a new status to a given content item in the first plurality of content items;
determining that more than a threshold quantity of impressions have been associated with the given content item; and
in response to determining that the threshold quantity of impressions have been associated with the given content item, transitioning the new status associated with the given content item to a different status.

13. The method of claim 1, further comprising:
determining that failure associated with the network connectivity between the first user account and the second user account is permanent; and
in response to determining that the failure associated with the network connectivity between the first user account and the second user account is permanent, removing the given content item associated with the failure.

14. The method of claim 1, further comprising identifying a list of possible actions based on a type associated with a given content item of the second plurality of content items.

15. The method of claim 1, wherein ranking the second plurality of content items comprises:
obtaining a first probability of a first action being selected in association with a first content item of the second plurality of content items, the first action being associated with a first value;
obtaining a second probability of a second action being selected in association with a second content item of the second plurality of content items, the second action being associated with a second value, wherein the first value associated with the first action is lower than the second value associated with the second action, and wherein the first probability is greater than the second probability; and
ranking the first content item higher than the second content item in response to determining that the first probability is greater than the second probability while the second value is greater than the first value.

16. A system for displaying a feed, comprising:
hardware processing circuitry;
hardware memory storing instructions that when executed cause the hardware processing circuitry to perform operations comprising:
identifying a group of user accounts associated with a first user account in a social network;
identifying content generated by one or more user accounts of the group of user accounts;
identifying potential actions associated with each of the identified content;
ranking the identified content based on the identified potential actions, the ranking comprising:
within a same content feed comprising a plurality of content items, identifying a first plurality of content items associated with respective creation times that precede a current time by less than a threshold and a second plurality of content items associated with respective creation times that precede the current time by more than the threshold;
ranking the first plurality of content items based on recency of the associated respective creation time of the first plurality of content items; and
ranking the second plurality of content items based on the potential actions associated with the second plurality of content items instead of recency of the associated respective creation time, wherein the first plurality of content items are ranked higher within the same content feed than the second plurality of content items and based on a different criterion than the second plurality of content items;
establishing a session based on credentials associated with the first user account;
causing a display of the identified content via the session according to the ranking;
determining a network status associated with at least a portion of the plurality of content items:
receiving a request to initiate a communication between the first user account and a second user account;
determining, based on the network status of the at least the portion of the plurality of content items, that network connectivity between the first user account and the second user account is not operable in response to receiving the request; and
generating an error message for display at a top of the content feed in response to determining that the network connectivity between the first user account and the second user account is not operable.

17. The system of claim 16, the operations further comprising providing the identified content, and identified potential actions to a trained classifier, wherein the identified content is ranked based in part, on output generated by the classifier.

18. The system of claim 17, the operations further comprising training a classifier based on a plurality of historical content, potential actions associated with the historical content, and indications of which of the potential actions were selected when the plurality of historical content and the associated actions were displayed, the classifier configured to determine a ranking for the identified content based on the training, wherein the ranking of the identified content is based on the ranking determined by the classifier.

19. A non-transitory computer-readable medium comprising non-transitory computer-readable instructions that, when executed by one or more processors, configure the one or more processors to perform operations comprising:
  identifying a group of user accounts associated with a first user account in a social network;
  identifying content generated by one or more user accounts of the group of user accounts;
  identifying potential actions associated with each of the identified content;
  ranking the identified content based on the identified potential actions, the ranking comprising:
   within a same content feed comprising a plurality of content items, identifying a first plurality of content items associated with respective creation times that precede a current time by less than a threshold and a second plurality of content items associated with respective creation times that precede the current time by more than the threshold;
   ranking the first plurality of content items based on recency of the associated respective creation time of the first plurality of content items; and
   ranking the second plurality of content items based on the potential actions associated with the second plurality of content items instead of recency of the associated respective creation time, wherein the first plurality of content items are ranked higher within the same content feed than the second plurality of content items and based on a different criterion than the second plurality of content items;
  establishing a session based on credentials associated with the first user account;
  causing a display of the identified content via the session according to the ranking;
   determining a network status of each of the plurality of content items:
  receiving a request to initiate a communication between the first user account and a second user account;
  determining, based on the network status of each of the plurality of content items, that network connectivity between the first user account and the second user account is not operable in response to receiving the request; and
  generating an error message for display at a top of the content feed in response to determining that the network connectivity between the first user account and the second user account is not operable.

* * * * *